(12) United States Patent
Wakim

(10) Patent No.: US 9,760,778 B1
(45) Date of Patent: Sep. 12, 2017

(54) OBJECT RECOGNITION AND NAVIGATION FROM ONGOING VIDEO

(71) Applicant: Amazon Technologies, Inc., Seattle, WA (US)

(72) Inventor: Peter Anthony Wakim, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 45 days.

(21) Appl. No.: 14/644,354

(22) Filed: Mar. 11, 2015

(51) Int. Cl.
*G06K 9/00* (2006.01)
*G06K 9/46* (2006.01)
*G06F 17/30* (2006.01)

(52) U.S. Cl.
CPC ...... *G06K 9/00711* (2013.01); *G06F 17/3028* (2013.01); *G06K 9/468* (2013.01)

(58) Field of Classification Search
CPC ...... G06K 9/00711; G06T 2207/20092; G06T 2207/20101; G06T 2207/20104; G06Q 30/0641; H04N 21/462; H04N 21/4622; H04N 21/4722; H04N 21/4725; H04N 21/478; H04N 21/47815
See application file for complete search history.

(56) References Cited

U.S. PATENT DOCUMENTS

2007/0078732 A1* 4/2007 Crolley ............... G06Q 30/02
705/26.1

OTHER PUBLICATIONS

Tivo. "About Tivo Premiere and Premiere XI." Mar. 6, 2010. Accessed Aug. 18, 2016, http://www3.tivo.com/buytivo/faqs/aboutpremiere/ index.html.*

* cited by examiner

*Primary Examiner* — Andrew W Johns
(74) *Attorney, Agent, or Firm* — Pierce Atwood LLP

(57) ABSTRACT

A system for performing object recognition on images in an image series, for example from a broadcast television signal or video-on-demand source. The system buffers images from the image series and accesses the buffer when an indication is received to start object recognition. The buffered images are sent to a recognition server, which returns object data for objects found in the image. The objects are then navigable using a user interface, through which the user can obtain additional information about the objects, or perform additional functions, such as adding the object to a shopping cart, etc.

20 Claims, 34 Drawing Sheets

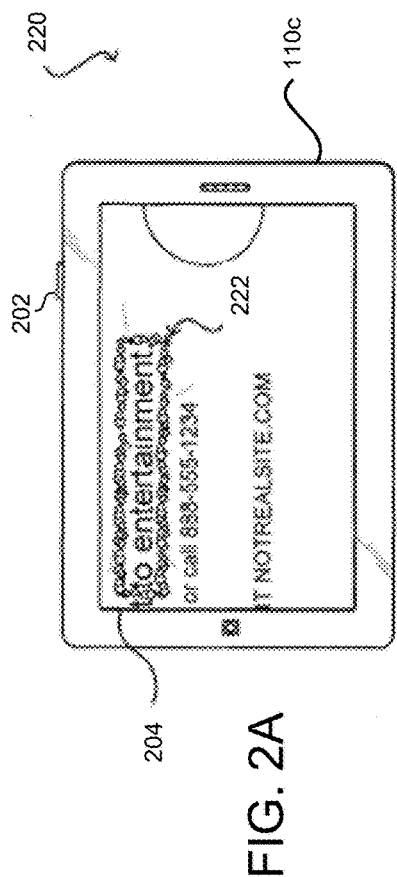
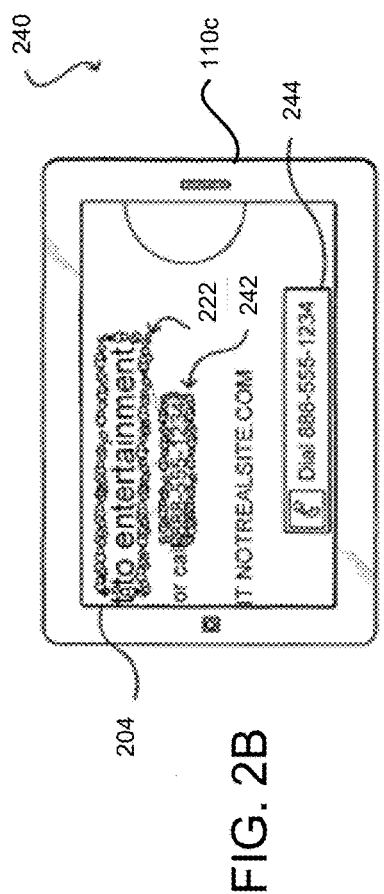
FIG. 2A
FIG. 2B

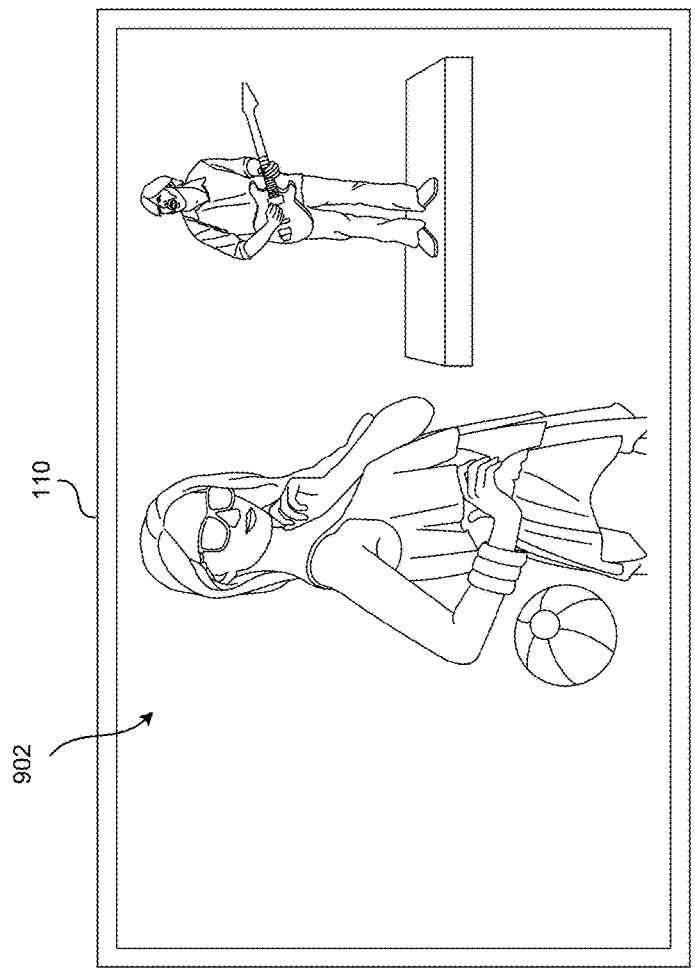

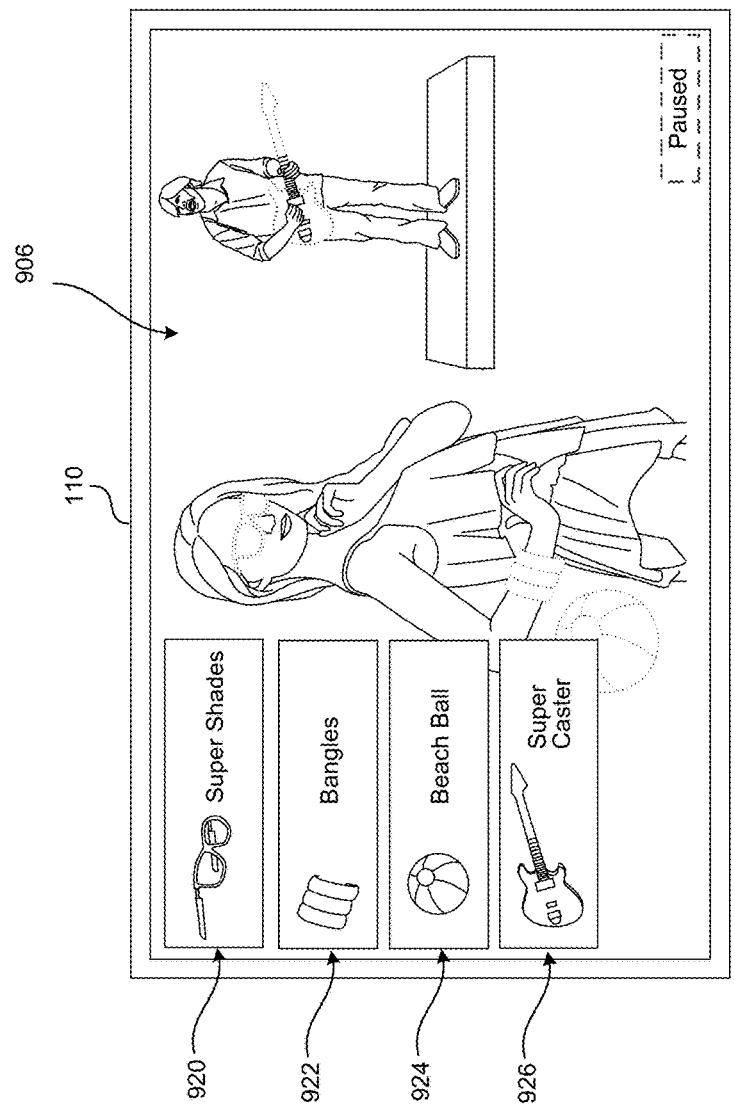

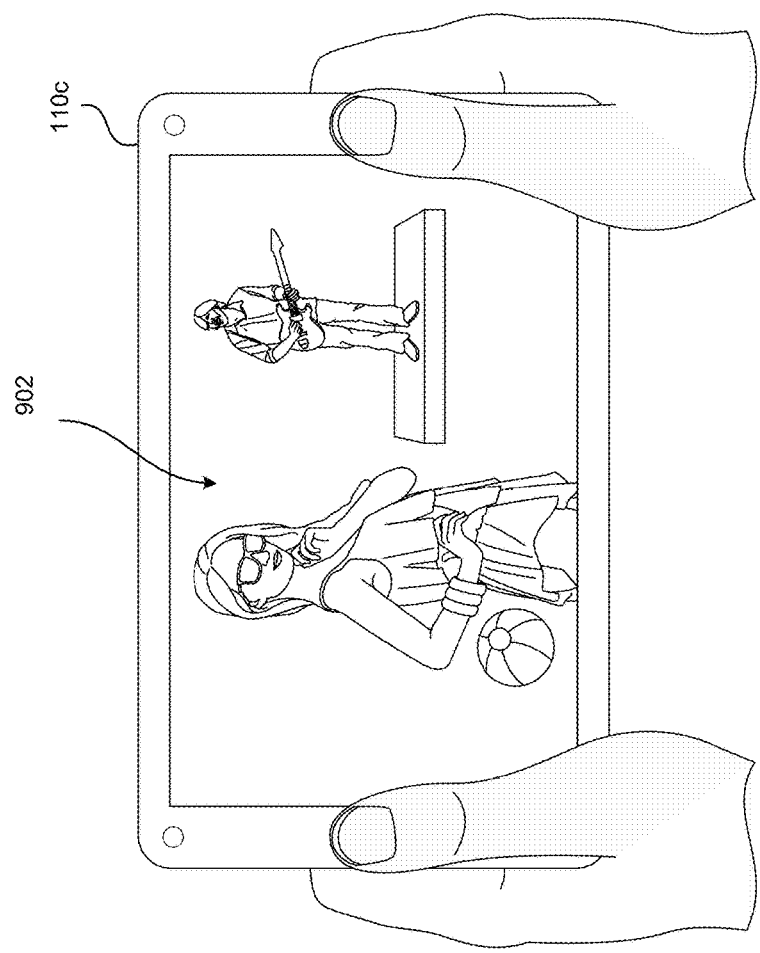

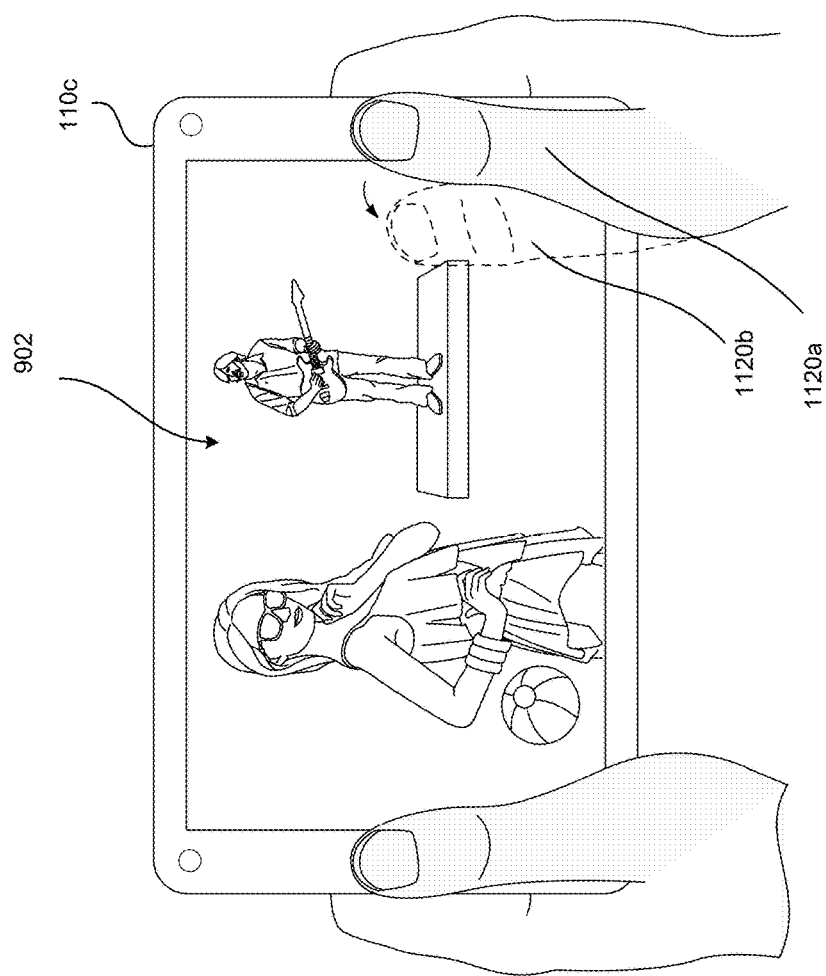

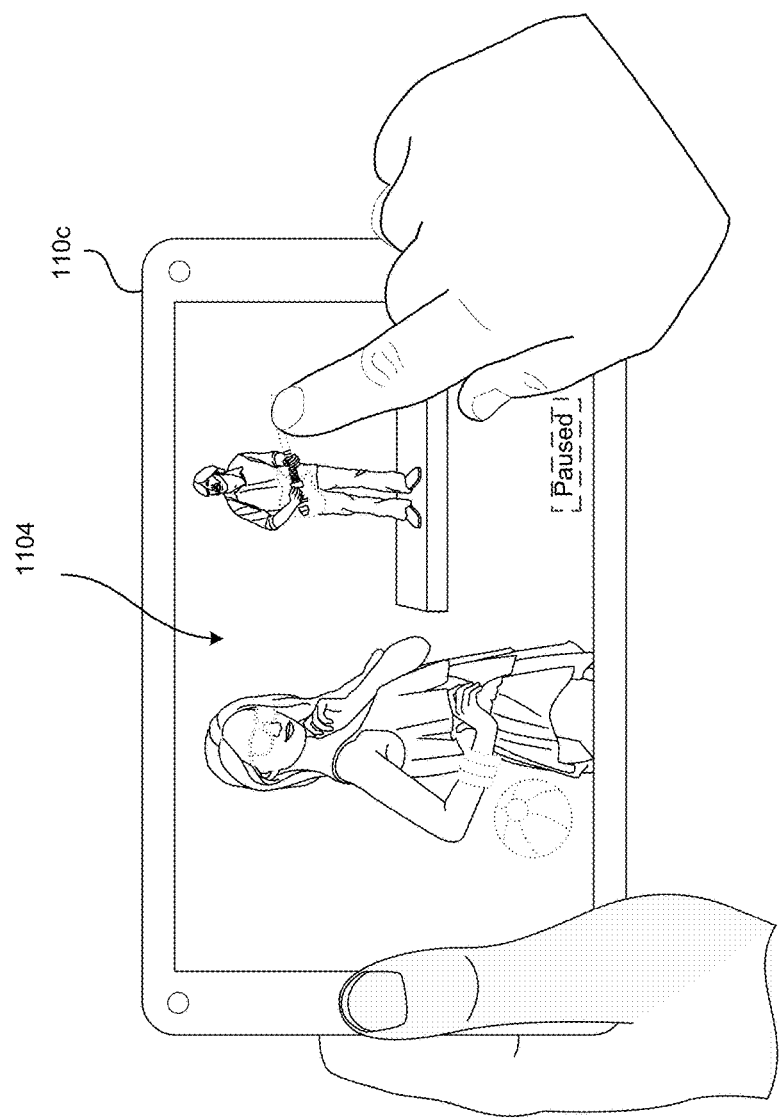

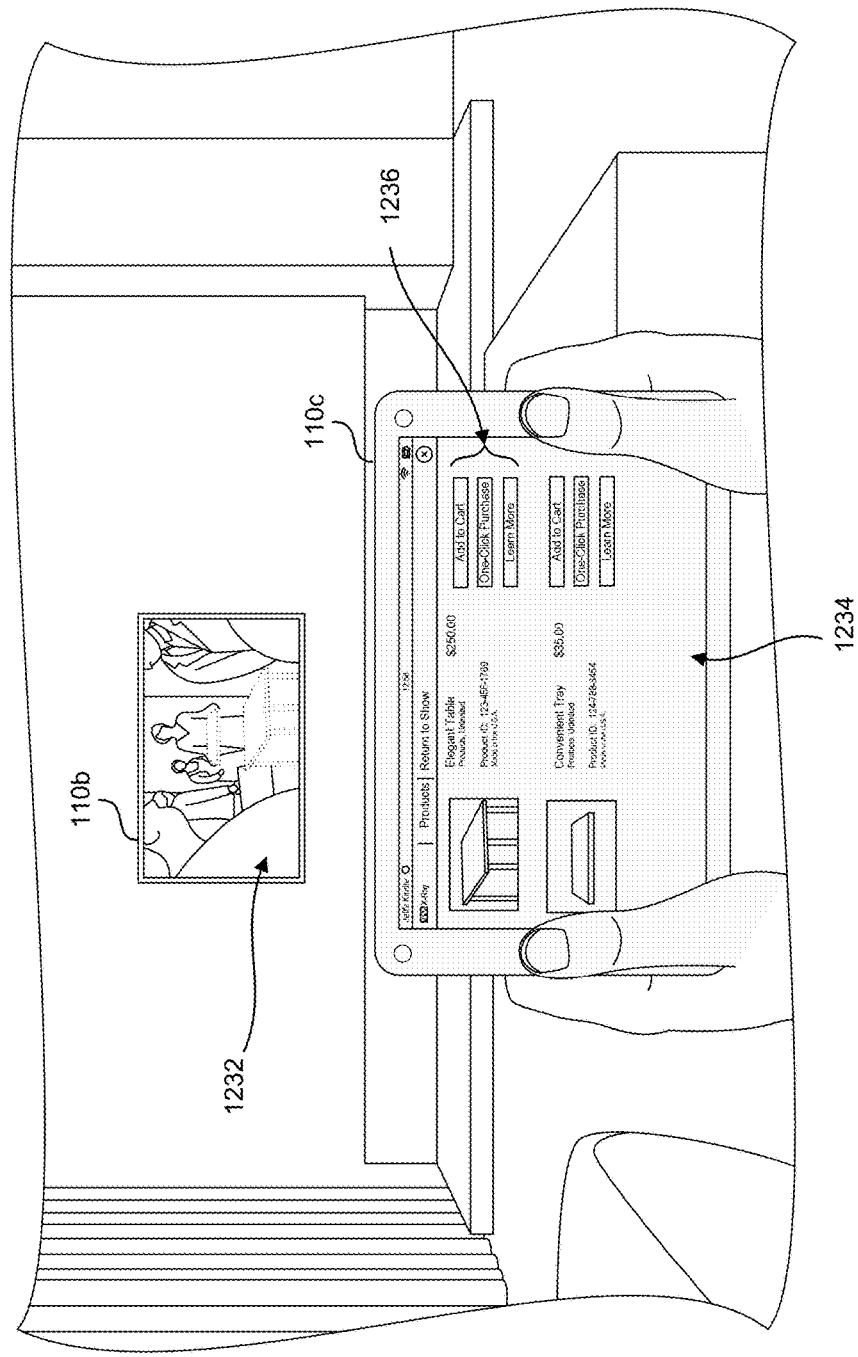

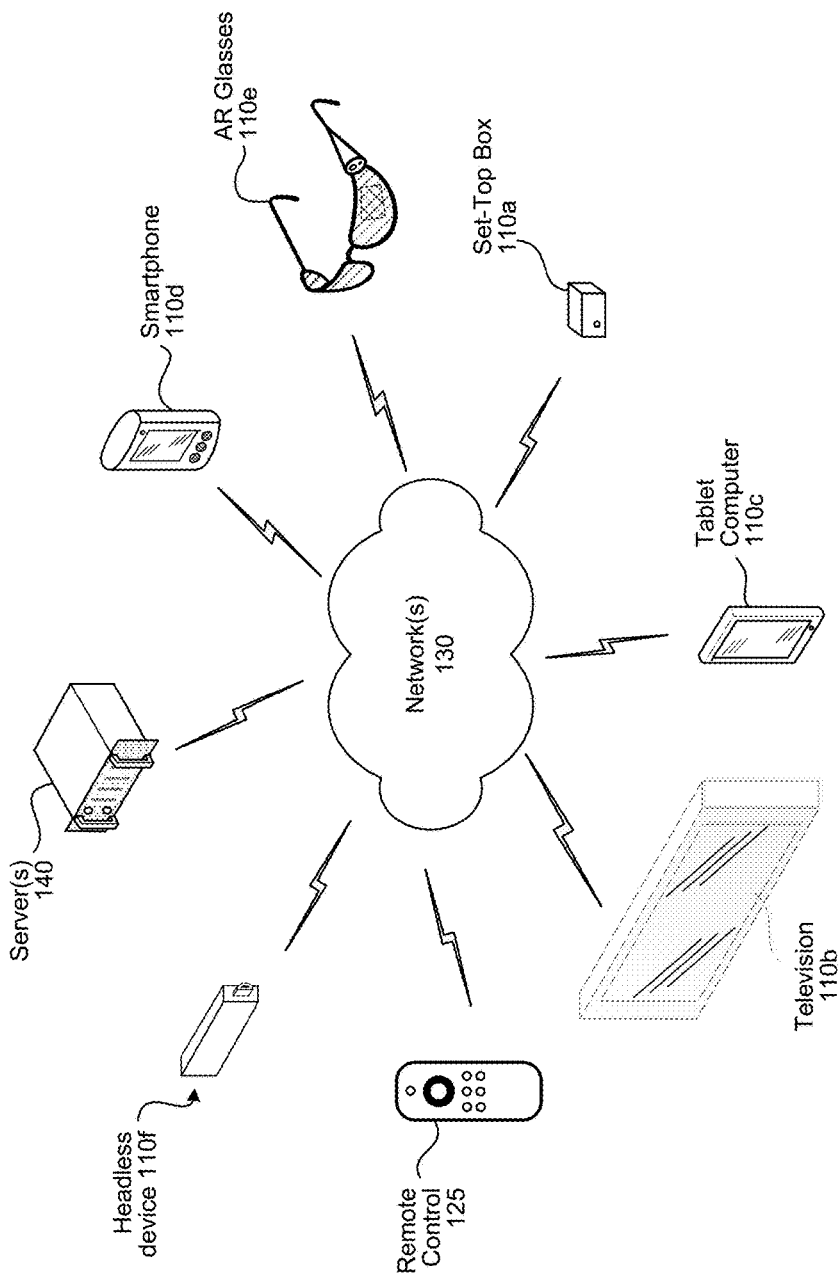

OBJECT RECOGNITION AND NAVIGATION FROM ONGOING VIDEO

BACKGROUND

People are increasingly utilizing portable electronic devices to perform a wide variety of tasks. As an example, people can utilize a camera of such a device to capture an image of an object. For example, a user can use a camera to capture a still image or video on things in the environment in the camera's field of view. There might be multiple objects in an image or video, and the user may not be able to determine what the objects are or know much about them. People may also desire to identify objects in images obtained from sources other than a device's camera.

BRIEF DESCRIPTION OF DRAWINGS

For a more complete understanding of the present disclosure, reference is now made to the following description taken in conjunction with the accompanying drawings.

FIGS. 2A-2D illustrate an example interface that conveys to a user which objects are recognized in a current view, as well as actions that can be accomplished using those objects, that can be utilized in accordance with various aspects.

FIGS. 9A-9D illustrate an interface for displaying recognized objects in image(s) from a video feed.

FIGS. 11A-11E illustrate identifying objects in a video feed and user navigation of identified objects using a tablet device displaying a visual interface.

FIGS. 12A-12E illustrate identifying objects in a video feed and user navigation of identified objects using a multiple device system configuration.

FIG. 15 illustrates an example of a computer network for use with the system.

DETAILED DESCRIPTION

Figure 1A:
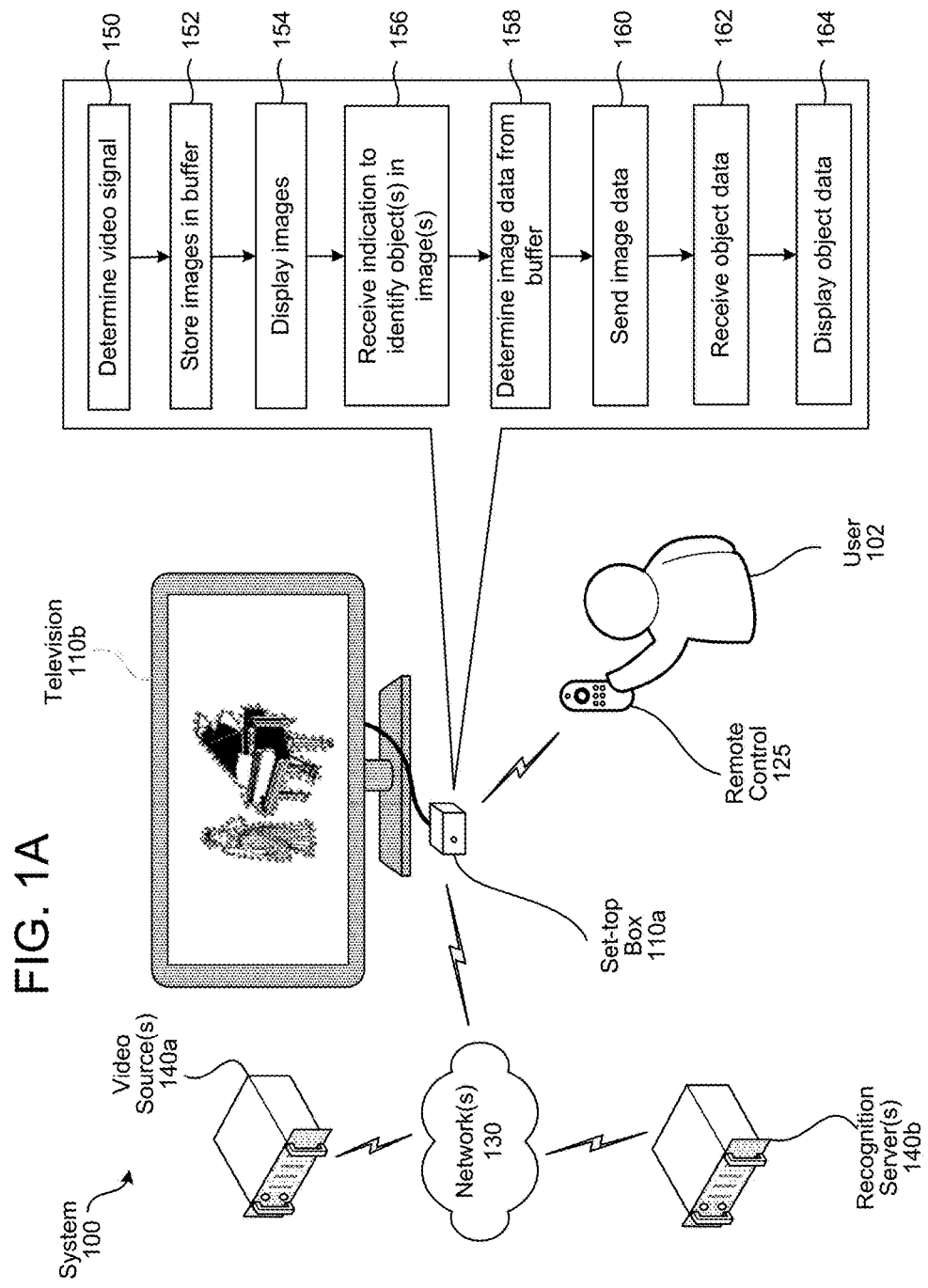
FIGS. 1A-1B illustrate an example of an object recognition system for identifying objects in a video feed and allowing user navigation of those objects.

Computing devices may assist users in identifying previously unidentified documents or objects in image(s). The devices may also identify certain text in images and provide the user with a device-executable action associated with the object and/or text. Certain devices have been configured to recognize objects in an image feed from a device-associated camera, such as a built-in camera in a phone or tablet device. For other video or image watching systems, particularly those that draw on pre-recorded video, video-on-demand, broadcast television, or the like, a different configuration for object recognition may be desired.

The present system describes image recognition in an image feed from a source that may be separate from an attached camera. Such an image feed may come from, for example, a television broadcast, cable television source, video-on-demand source, or similar video feed. Images from the video feed are stored in a buffer on a device. Certain processing may be performed on the buffered images as described below. In response to receipt of a user-initiated indication to recognize objects, for example from a remote control, touch interface, etc., the system may perform object recognition. Upon receiving the indication the system may analyze previously stored images in the buffer and determine one or more selected images from which objects may be recognized. The one or more selected images may be images that meet certain image metric criteria (for example being a clear, in-focus image) and/or meet other criteria (such as being part of the image feed at a certain configured time prior to receipt of the indication). The system may send image data from the one or more images (along with potential metadata regarding the images) from a device that receives the user indication to an object recognition server. The server may then perform object recognition and send object data to the device, which will then display the object data so that a user may review it. The user may then navigate the object data through an interface of the device and perform other actions (such as requesting even further information/supplemental content, purchasing a product, etc.).

In recognition systems, such as that disclosed herein, a computing device may be enabled to analyze information, such as image data stored in an image buffer, to attempt to identify one or more objects represented in the image data. The system may then obtain supplemental content, or suggest potential functions for user execution, based on the object(s) represented in the information. Supplemental content may include information about a recognized object that is not otherwise discernable from the information available to the user's device absent the object recognition system. The objects can include tangible and/or intangible objects, such as may include, for example, text strings, bar codes, products, individuals (for example persons identifiable using facial recognition techniques), etc. The system may match the recognized object to other information sources and retrieve information from those sources to present to the user. This matching may occur substantially in real-time, to provide the user with an experience of having supplemental content/functionality available while engaging with primary content (such as the video feed).

FIG. 1A illustrates an object recognition system 100 for implementation of aspects disclosed herein. The system 100 may include a number of different components. As illustrated, the system includes a set-top box 110a connectively connected to a television 110b. Though certain operations described herein are described as being performed by the set-top box 110a, the television 110b (or other device 110 such as those described below) may also be configured with the components of the set-top box 110a rendering a separate physical device unnecessary. The system may also include one or more recognition servers 140b as well as one or more video sources 140a. The system may also include a remote control 125, which is illustrated as being communicatively connected to the set-top box 110a, for example through an infrared (IR), WiFi, radio frequency (RF), or other wireless connection. The remote control 125 may also connect to the set-top box 110a (or other system components) through network(s) 130. The other system components (e.g. recognition server 140b, video source 140a, television 110b, set-top box 110a, etc.) may also be communicatively connected across network(s) 130.

As illustrated in FIG. 1A, a device such as set-top box 110a determines (150) a video signal. The video signal may be of any number of different forms or configurations. For example, the video signal may include a broadcast television signal, a program from a video-on-demand source, etc. The video signal includes a plurality of images, such as video frames, that are configured to be played back in a particular order to form the watchable program at a receiving end. The video signal may also include audio data, where the audio data is configured to accompany playback of the individual images/video frames of the video signal. The video signal may be received from video source 140a over the network 130. The video source 140a may be, for example, a video-on-demand source such as Amazon Instant Video, or another source such as a cable television server or an over-the-air television signal broadcast tower which may be received using an antenna (not pictured) connected to the set-top box 110a. The set-top box 110a may then store (152) images from the video signal in a buffer. The set-top box 110a may also store image data associated with the images in the buffer. The image data may include portions of images, processed images (for example, binarized versions of the images), or data metrics relating to the images. The image data may be buffered along with, or instead of the actual images. The images/image data may be stored in a buffer either prior to or after displaying (154) the images, for example on the television 110b. To display (154) the images, the set-top box 110a may send the video signal to the television 110b, either before, after, or in parallel to storing the images in the buffer. The buffer of the set-top box 110a may be a circular buffer that stores a certain number of images and overwrites them as new images are received from the video source 140a. As noted below, the buffer may also include audio data from the video signal so that the system may recognize audio objects in the video signal. The audio data is also stored in the buffer prior to object recognition. The buffer may also store other data, such as metadata relating to the video signal as described below.

The video signal may continue to be displayed on the television 110b until the system receives (156) an indication to identify object(s) in one or more images of the video signal. For example, a user 102 may be watching a television program and see an object that he/she wishes to learn more about. The user may then push a button on the remote control 125 which sends an indication to the set-top box 110a to perform object recognition. Upon receipt of the indication, the set-top box 110a may determine (158) image data from the buffer. The determined image data may be image data corresponding to images that were stored in the buffer prior to the time the indication was received or prior to the time the indication was made (if the indication is associated with a timestamp or other time indicator). The system 100 (through the set-top box 110a) may then go backwards through the buffer to determine what image(s) were intended to be recognized by the user, what image(s) may be processable by the recognition server 140b, what image(s) are likely to include recognizable object(s), etc. The system 100 may then send the determined image data (which may include images, portions of images, metadata related to images, etc.) to the recognition server 140b for processing. The recognition server is capable of running one or more image recognition or analysis algorithms on the image data to attempt to recognize objects in the image as well as identify text within the image. This can include, for example, at least one optical character recognition (OCR) algorithm.

The recognition server 140b may receive the image data (and any accompanying data) and process that data to recognize object(s) represented in the image data. In FIG. 1A, those objects may include the singer and piano illustrated as being displayed by the television 110b. The recognition server 140b may then send object data associated with the recognized objects to the set-top box 110a which receives (162) the object data. The set-top box 110a may then process the object data and send it to the television 110b where the object data is displayed (164).

Figure 1B:
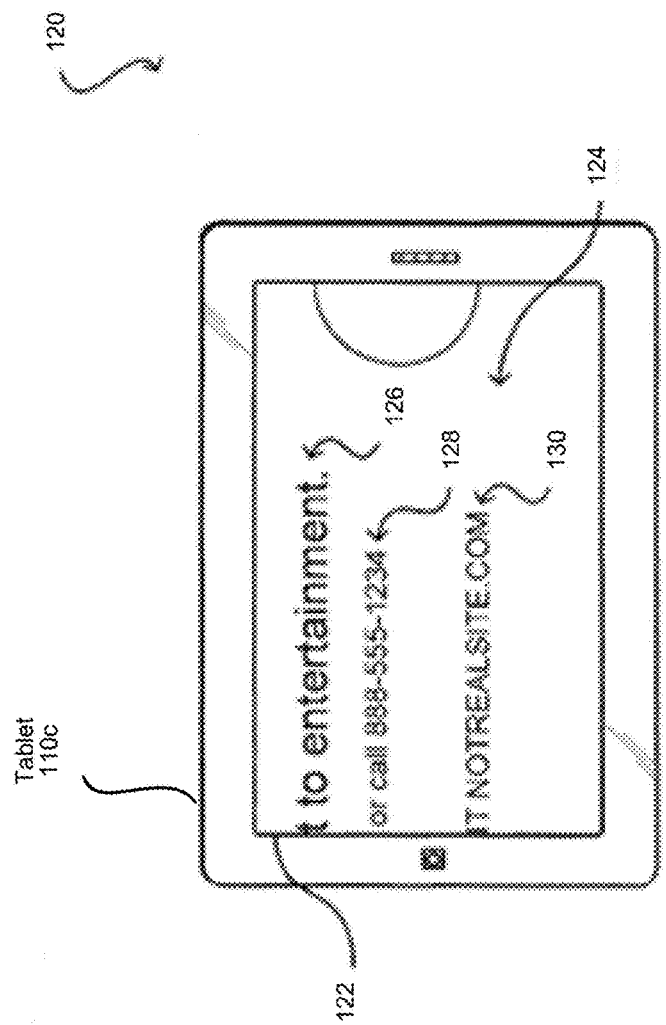

Although not illustrated in FIG. 1A, the user may then navigate the object data to obtain more information about the objects represented in the processed image(s). This navigation is explained in detail below both in reference to television-based embodiments as well as embodiments related to hand-held devices. For example, FIG. 1B illustrates an interface that enables a device, such as a tablet 110c, to convey which objects in an image have been recognized. This may include displaying a visually enhanced representation of objects that are recognized by the system. The visually enhanced representation may include a highlighting of an object, surrounding it with a border (for example a border that is of a color or texture that makes the object stand out from the remainder of the image. The visually enhanced representation may also include making the object increase and decrease in size (for example, in a pulsing effect). The visually enhanced representation may also include displaying a set of virtual "fireflies" or other types of graphical elements over a live view of image (e.g., video) data being acquired by the device or over previously stored or otherwise non-live content to indicate that certain objects in the content have been recognized. The graphical elements may activate in a manner to indicate that some object in the content may be recognized by the device, such as by creating a dynamic bounding box around a representation of each such object or forming an appropriate shape on the display. For example, the graphical elements may be animated or otherwise configured to appear to gather by, be contained in, or otherwise associated with at least one launch button, for example, which may include a physical hardware button (such as a dedicated button or configurable button on a remote control), a virtual button displayed on a touch screen, or another such user-selectable element where selection of the launch button by the user may instigate a further action, as detailed below. The graphical elements may then change their appearance upon selection of the launch button. For example, in response to recognizing an object, some or all of the graphical elements can be rendered to form an animated shape, such as by being animated to appear to move across the display and form an animated bounding box 222 proximate to the representation of the recognized object as illustrated in the example situation 220 of FIG. 2A. In some aspects, the graphical elements may be animated in a first state when certain (or no) information is to be conveyed and a second state when other information is to be conveyed, where the first and second states can vary in aspects such as maximum brightness, average intensity, color range, average brightness, density, flashing rate, and the like. As mentioned, some of the graphical elements might appear to move and some might just appear near the representation of the object. The graphical elements may also form different shapes and/or take a different appearance depending on analyzed content or the recognized objects within the content. Other forms of visually enhanced representations are also possible. The visually enhanced representation may be achieved by overlaying an image from an image feed with certain visual elements or may be achieved by altering an underlying image. Further, the visually enhanced representation may be presented on a still image (for example, a paused image from a video signal) or on a "moving" image, for example, on multiple images of a continuing video signal.

A device may enter a discovery/recognition mode in response to a user selection (such as selecting a discovery launch button), in response to power on (or wake up) of the device or through some other way. The system may even perform object recognition or identification (and supplemental content identification) on content items before they are even accessed by a user device, for example using images in an image buffer in anticipation of eventually receiving a user-instigated command to perform object identification and/or recognition. For present purposes, object identification refers to the process of determining the presence of a potentially recognizable object in an image and object recognition refers to the process of determining what the object is. (I.e., an image recognition process may determine that there are two objects in an image and an object recognition process may determine that the first image is an Amazon Kindle Paperwhite and the other object is a coffee mug.) Either recognition and identification may be used when generally describing the operation of the system. However, when one operation is to be distinguished from the other, appropriate distinctions will be described in the text.

Different recognition algorithms and/or services may be used to perform object recognition to recognize different types of objects. For example, a string might be recognized as text that matches a determined pattern, such as a pattern indicating the text is a phone number or URL. Accordingly, information for these objects might be processed by a different algorithm or process. The different types of processing therefore can result, in at least some aspects, in different objects being recognized at different times. Similarly, different objects might be recognized at different times due to changes in the image that enable different portions to be recognized at different times, among other such options.

In response to a second object being recognized, as illustrated in the example situation 240 of FIG. 2B, the graphical elements may create a bounding box 242 or other such indication about the second recognized object, here a phone number. Such presentation can indicate to the user that both objects surrounded by bounding boxes have been recognized and/or identified. In different aspects, the graphical elements may bound the phone number at different times, such as when the string is identified as a text string, when the string is identified as a phone number, or when information for the phone number is located, among other such options. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

In various aspects, a type of the object can also be determined. In at least some aspects, this can include at least an "actionable" or a "non-actionable" type, or equivalent(s). For example, a text string such as "to entertainment" might be a portion of text that can be handled as normal text, such as for copying and pasting, which might not be considered an actionable object/text in at least some aspects (while being considered actionable in others). Objects/text such as a phone number or URL might be considered to be actionable objects as the computing device can perform at least one specific function with respect to each of these objects that might be of interest to a user. For each actionable object, every recognized object, or at least one recognized actionable object, for example, the interface can provide a user-selectable input, icon, or element associated with the representation of that object. In other aspects, a user-selectable input or element might be provided for each recognized object, or a specific subset of recognized objects, among other such options. Objects such as barcodes and quick response (QR) codes might be considered either actionable or not actionable objects in different aspects. Similarly, objects such as songs might be considered actionable if the software is linked to a song identification and/or purchasing source, and text might be considered actionable if a translation is available.

In various aspects, the user-selectable icon can take the form of what will be referred to herein as a "ribbon" 244, although various other types of elements or objects can be utilized as well within the scope of the various aspects as discussed and suggested elsewhere herein. In this aspect, a ribbon 244 may be comprised of at least two parts: information about the object and information about at least one action that can be taken. As illustrated, the ribbon can list the phone number that was recognized, such that the user can determine whether the phone number was properly recognized before using the number. The ribbon can also identify the action that can be taken, in this case using a phone icon and including the word "dial," although various other indications can be used as well. In some aspects the user might be able to select from different options or cause a specific action to be associated with a type of object, such as where a user would like to send a text, or make a video call instead of a conventional phone call, among other such options. In certain embodiments, such as an embodiment where the ribbons are displayed on a limited functionality device, such as a television set, certain functionality options may be removed in order to improve the user experience (for example by removing functionality that would be difficult to execute using remote control 125).

In some aspects, such as when operating on a touch sensitive device, a ribbon might have two touch targets: a first target that comprises approximately 80% of the area of the ribbon that enables the user to select the primary action, and a second target of approximately 20% of the ribbon area that enables the user to go to a detail card, or other such element, that provides other actions or plugins applicable to that object, as well as potentially a copy of the image that was used to recognize the object for context, among other such possibilities. As discussed, a ribbon in some aspects can include at least three things to display: an image relating to the object, a title or name of the object, and a source of disambiguation, such as an author or artist name to help a user distinguish that object from other objects with the same or similar names or titles, etc. Ribbons (or other user-selectable icons) can also provide different actions for various types of objects. For example, a ribbon can include an action to purchase or download a song that was recognized from audio data, or to play a movie that was recognized from audio data and/or video data captured by one or more sensors of the device.

Figure 2C:
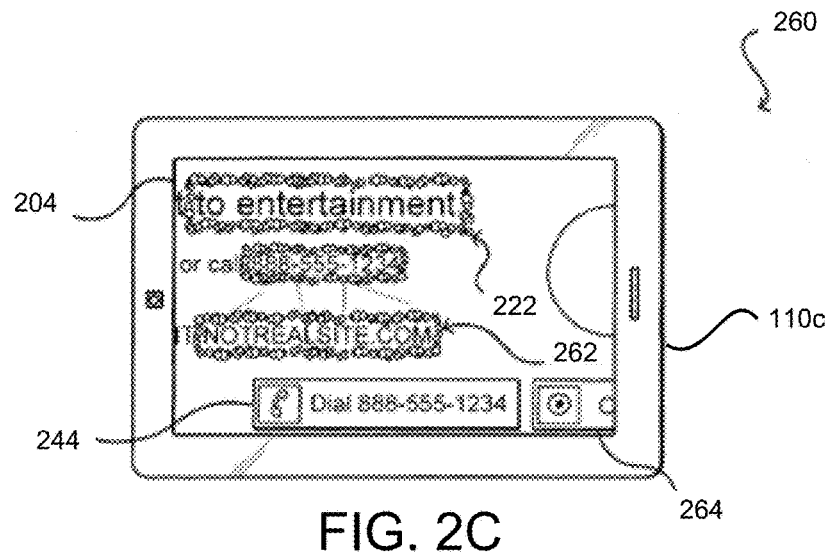

As illustrated in the example situation 260 of FIG. 2C, the device might recognize additional objects as well, such as by using additional algorithms, plugins, services, or processes or when the portion or quality of the captured image changes, among other such options. In this example, another object is detected, which causes an additional bounding box 262 to be created. Since the object is actionable, an additional ribbon 264 can be created that enables the user to cause a specific action to be performed with respect to the newly recognized object. In some aspects where multiple actions can be performed with respect to an object, multiple ribbons can be displayed on the display screen. In other aspects, a ribbon might have more than one label, with each label referring to a different possible action. For example, the image data might include a representation of a movie theater sign, a newspaper advertisement, and/or various other objects, where a user might want to call (e.g., for reservations/tickets) or learn more information about the object (see artist's website, watch movie trailers, view menu, etc.) before doing so. Labels also can indicate functionality such as an ability to visit a third party's social media page (e.g., a social media page for a restaurant or musical artist represented in the poster/ad). In the illustrated example the first ribbon is displayed in a center portion of the display with additional ribbons added to the right, although in other aspects the newer ribbons can be presented in the center and can be animated to appear to "push" the older ribbons to the right or left, among other such options. In order to access the other ribbons, then, the user can swipe, scroll, or otherwise navigate to those ribbons using any of a number of navigational approaches used for such purposes.

Figure 2D:
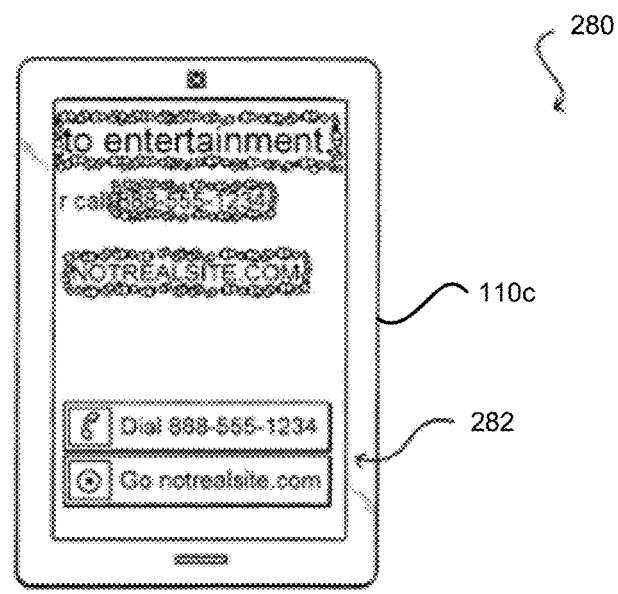
Figures 3A, 3B:
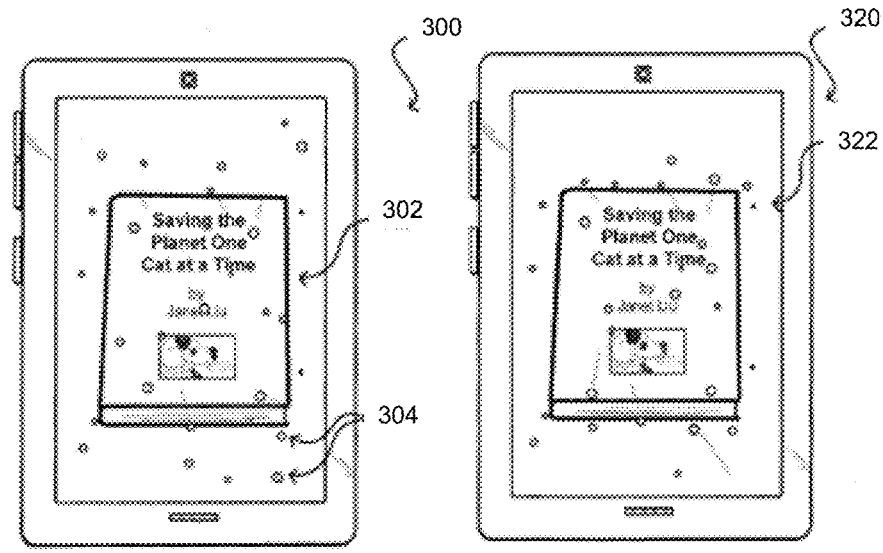
FIGS. 3A-3D illustrate an example interface enabling a user to perform an action for a recognized object that can be utilized in accordance with various aspects.
Figures 3C, 3D:
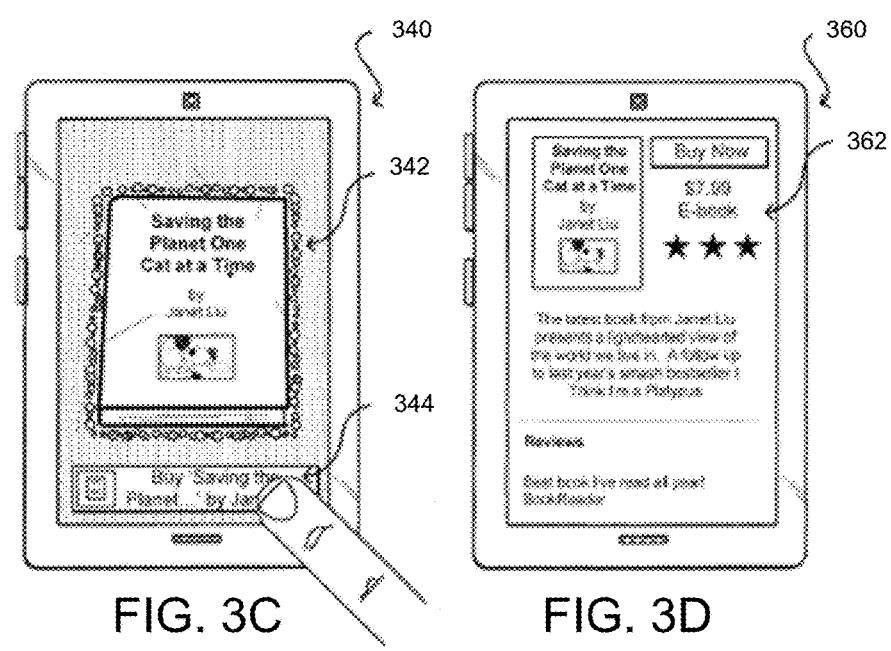

As illustrated in the example situation 280 of FIG. 2D, the ribbons 282 can also be displayed to appear to be stacked vertically on top of one another, among other such options. In this example, the first ribbon appears on top with the others appearing below, while in other aspects the most recently generated ribbon can always appear on top, among other such options. As new ribbons are generated and the number of ribbons exceeds the number of ribbons that can be displayed, as may be a fixed, variable, or user-configurable number, for example, the older ribbons can be "pushed" off screen, but available to the user via one or more navigational approaches as discussed elsewhere herein. Various other approaches for displaying, moving, and navigating ribbons or other selectable elements can be utilized as well within the scope of the various aspects.

FIGS. 3A through 3D illustrate another example interface that can enable a user to perform an action with respect to a recognized object in accordance with various aspects. In this example, as illustrated in the situation 300 of FIG. 3A, a user might be interested in obtaining information about a particular item, in this case a book 302 that may be displayed in a video feed, for example as shown during a television program. As mentioned previously, the device can display a group of graphical elements 304 that, at least initially, can move or flash about the display screen at relatively random (or at least somewhat scattered) fashion. In some aspects, one or more algorithms executing on the device can begin to locate features in the live view that might correspond to recognizable objects. As discussed, these can include things like edges, transitions, end points, and other features or aspects that can be used for tasks such as computer vision and image recognition as known or used in the art. In the example situation 320 illustrated in FIG. 3B, at least some of the graphical elements 322 can begin to move towards at least some of these features as they are identified. For example, since the edges of the book will likely be detected as potential recognizable features, at least some of the graphical elements 322 can begin to move and/or appear near the edges of the book. Once the object is identified, the fireflies can move to create a bounding box 342 or other indication about the recognized object, as illustrated in the example situation 340 of FIG. 3C. In some aspects, as illustrated, other portions of the live view can appear to darken, change in color or brightness, or otherwise be modified to further highlight the portion of the image that corresponds to a recognized object. In this example, the object was identified as a book available for purchase, whereby a ribbon 344 is displayed on the display screen. The ribbon in this example includes an image of the book, as may be obtained from a product data store, and the ability to purchase or obtain additional information about the book. In this example, the user is able to select the ribbon 344 to cause the device to navigate to a web page 362 that enables the user to purchase a copy of the book, as illustrated in the example situation 360 of FIG. 3D. If the user had already purchased a copy of the book in electronic form, for example, the ribbon could instead provide an action that, when selected, causes the e-book to be displayed in an e-book reader application, for example. Various other actions can be taken as well.

In many instances, as mentioned, there can be multiple actions that can be taken. For example, a phone number might be used for text messaging, a voice call, or a video call. If a URL contains a foreign word, actions might include opening the URL in a Web browser or translating the word. Various other actions can apply as well. Accordingly, in at least some aspects the types of action may be selectable by a user, or the algorithms for suggesting these actions might be ranked or otherwise prioritized. For example, an object being recognized as a URL might always take precedence over the object being identified to contain a foreign term, as the user will be more likely on average to want to follow the URL than to translate it. In some cases, such as where a user can make a voice, video, or VoIP call, for example, the device might analyze the user's historical usage or present the user with options or preferences, for example, that can determine which action to provide to the user in a ribbon. In at least some aspects, the ribbon can contain an option that enables the user to view other available actions, and select one or more of those actions to be performed.

The various processing steps described here may be performed entirely by one device or divided among multiple devices. For example, a local user computing device may perform certain functions (such as identifying that objects appear in an image) and a remote server may perform other functions (such as recognizing what the objects are). In a remote computing configuration, more complex processing tasks, such as image processing, recognizing actionable objects within content, etc. may be performed by a remote server. The same remote server (or group of servers) may perform object recognition on images from an image feed, such as images stored in a buffer.

In order to provide at least some of the functionality discussed herein, in at least some aspects an amount of image processing (or pre-processing) can be performed on the local (i.e., user) computing device. This can include, for video data, identifying regions such as edges or sharp transitions that are likely to correspond to recognizable objects. For example, the detection of unique or interesting features or characteristics can be performed on the local device, in order to determine whether there is sufficient data to warrant sending an image (or data extracted from the image) to a remote server. In some embodiments, there can be an amount of pattern matching performed on the device to determine whether the features likely correspond to a representation of a recognizable object, in order to cause the fireflies to move to that location before a full recognition is done and/or image data is sent to a server. Further, basic pattern matching can help the device to determine a likely type of object, such as whether the object is a body or string of text, a quick response (QR) code, etc. The behavior and/or characteristics of the graphical elements may then change as appropriate before data is sent to and/or received back from a server, reducing the lag time experienced by users of the device. Similarly, if a quick match on the device can identify an object as something already recognized, for which there is data stored on the device, the graphical elements may use a color, shape, and/or size appropriate for that object, for example, and a corresponding ribbon can be presented without need to contact a remote server or service, etc. Further, a local device may be configured to perform object identification on images in a buffer, including determining coordinate(s) associated with identified objects. The local device may then send image data along with metadata that may include the coordinate(s) data to a remote server for object recognition. By performing object identification ahead of time, object recognition in response to a user indication may be performed more quickly. This is described further in reference to FIGS. 6A-6C below.

Figure 4:
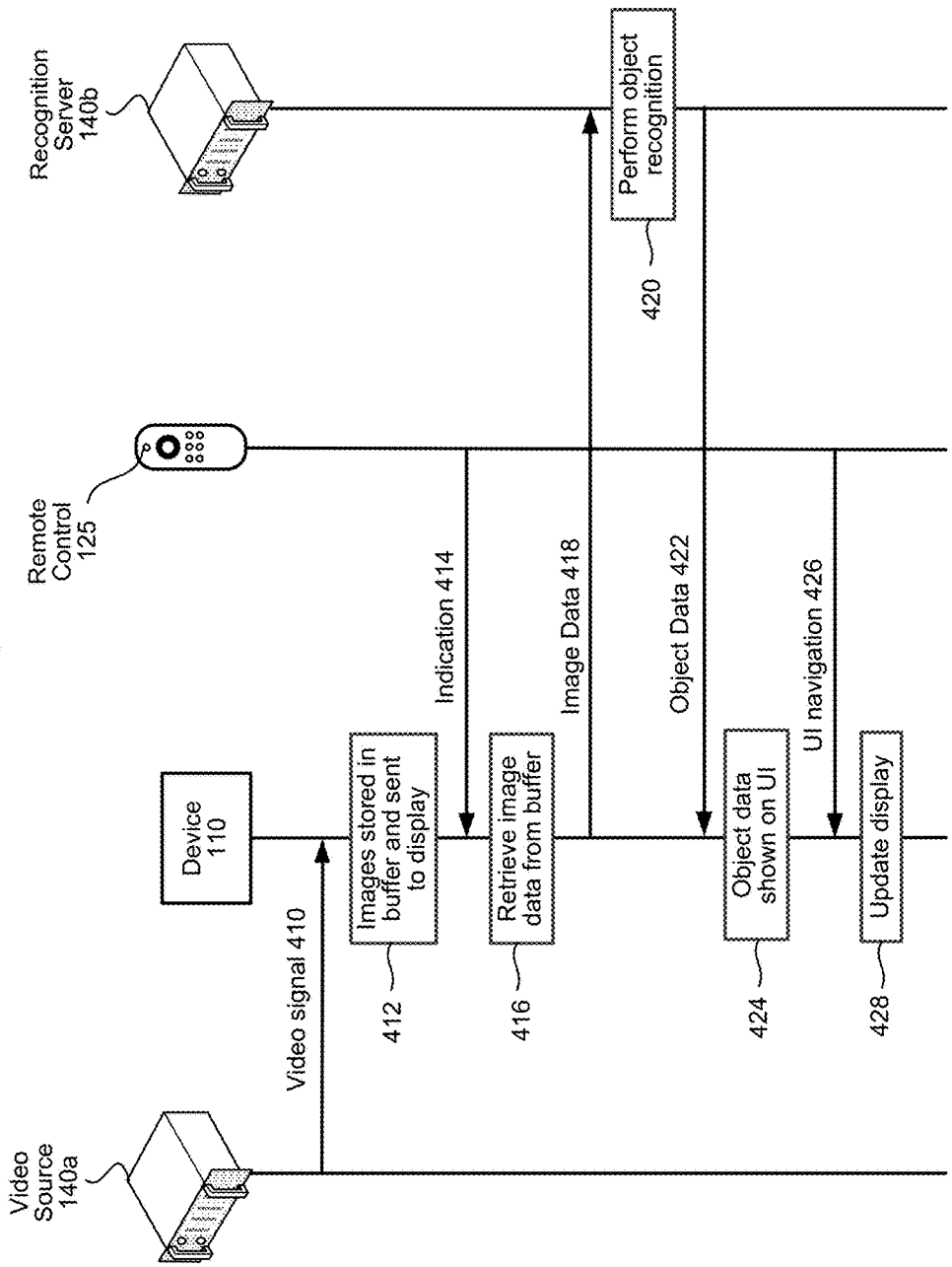
FIG. 4 is a signal flow diagram illustrating data flow for object recognition.

FIG. 4 illustrates an example of how data may be exchanged between components in the system 100. As illustrated in FIG. 4, device 110 may be a device that includes both the buffer and the display (such as a tablet 110c) and may include the capabilities of multiple other components (for example the set-top box 110a and television 110b of FIG. 1A). As shown in FIG. 4, a video signal is sent (410) from a video source 140a to a device 110. The device may then store images from the video signal in a buffer and display images (412) from the video signal on a display. The device 110 may then receive an indication (414) to recognize object data. The indication may come from, for example, remote control 125, or may come from another source such as a virtual button on a touchscreen, from a dedicated device button 202, or the like. In response to the indication, the device 110 then retrieves image data from the buffer (416), where the retrieved image data was stored in the buffer prior to the indication being received and/or sent. The device 110 then sends image data (418) to the recognition server 140b. The recognition server then performs object recognition (420) on the image data and sends object data (422) to the device 110. The device then shows at least a portion of the object data on the display (424) as part of a user interface (UI). The user may then navigate the UI (426), for example using the remote control 125. The device 110 may receive the navigation commands and then update the display (428) in response.

The buffer described herein may maintain a certain number of images from the video signal in a circular fashion and may overwrite older images as new images in the series are received. An indication to perform object recognition may be associated with a time, be that the time the indication is made (for example, the time the button on the remote control 125 is pushed) or the time the indication is received (for example, when the indication is received by the device). To preserve the time the indication is made the remote control 125 may be equipped to create a timestamp associated with the indication. The timestamp may then also be sent from the remote control 125 to the device 110. If the device is a touchscreen device, such as a tablet 110c, the time the indication is received may be the same as the time the indication is made.

When the indication is received, a device may go through the buffer of stored images to identify one or more images that were stored in the buffer prior to the indication being received/made. This is so the system can determine an image(s) to select that may contain the object the user wished to identify that led to the indication. Determining the selected image may include analyzing the image metrics of the images to determine what images may be likely for a recognition server 140b to process.

Figure 5:
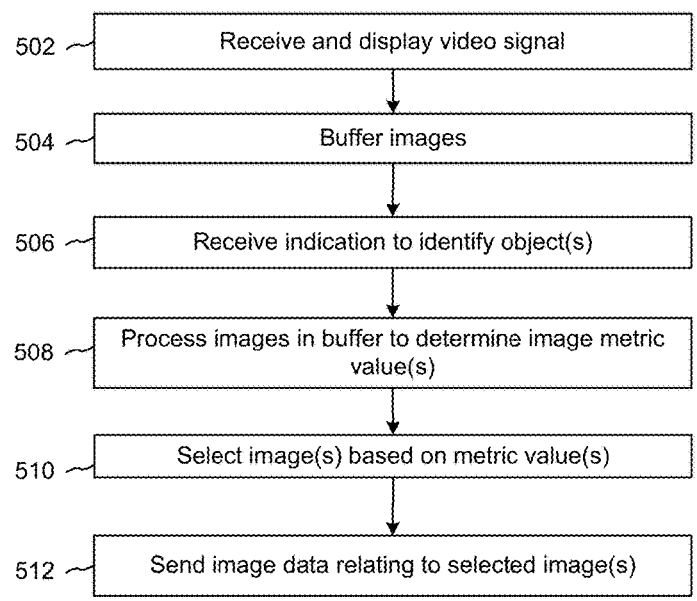
FIG. 5 is a flowchart illustrating image selection for object recognition.

Although described in reference to image data, object recognition may also be performed for audio objects detected in the video signal. In such an operation, audio data may be buffered and sent from the device 110 to the recognition server For example, as shown in FIG. 5 a device may receive and display (502) a video signal and buffer (504) images from the series. The device may receive (506) an indication to identify object(s) in the video signal. The device may then process (508) images in the buffer to determine image metric value(s) associated with the buffered image(s). Such image metrics may include any metrics known in the art of image processing such as a focus metric, edge metric, brightness metric, motion metric, contrast metric, or the like. The device may then select (510) images based on the metric value(s). In this manner the device may select images with good focus, high contrast, low motion, or having other qualities that will improve a recognition server's ability to process the images to recognized objects represented within. The device may thus employ known computer vision or image processing techniques to select one or more images. The device may then send (512) image data relating to the selected image(s) to a recognition server 140b for further processing. The image data may include an entire image (i.e. video frame) from the video signal, a portion of an image from the video signal, a processed version of an image portion from the video signal, data representing an image (or portion thereof) from the video signal, or other types of image data.

As part of determining images and image data that will be processed for object recognition, a local device 110 may perform certain operations prior to sending image data to a recognition server 140b. In certain embodiments a local device may perform some pre-processing to assist the recognition server 140b and to generally reduce the amount of time it takes to perform object recognition tasks, thus reducing any lag noticeable to a user. Such pre-processing may take a number of forms. In one example, a device 110 may perform preliminary object identification processing, where the device 110 analyzes images in the buffer to determine where objects may be located in an image. Such pre-processing may be performed even before an indication is received, such as from remote control 125, to perform object recognition. In this way the device 110 may preliminarily determine where in an image object(s) are located. Such pre-processing may create metadata that is associated with the video signal, for example, metadata associated with each individual image. The metadata may then be stored by the device 110 and associated with the respective image in the buffer. When an indication to perform object recognition is received, the metadata may be sent to a recognition server 140b along with the image data to assist in the object recognition process.

The metadata may include various different types of data. For example, the metadata may include processed representations of images in the buffer, for example a binarized e.g., black and white) version of an image. Other examples of metadata may include image metric data relating to an image, timestamp information relating to an image's position in the buffer and/or in the video signal, feature vectors describing an image, or the like. The metadata may also include data relating to audio portions of the video signal. For example, compressed or otherwise processed audio, timestamp data describing the position of the audio in the buffer and/or in the video signal, feature vectors describing the audio of the signal, etc. The metadata may be sent to the server along with image data and/or audio data for purposes of performing object recognition.

Figure 6A:
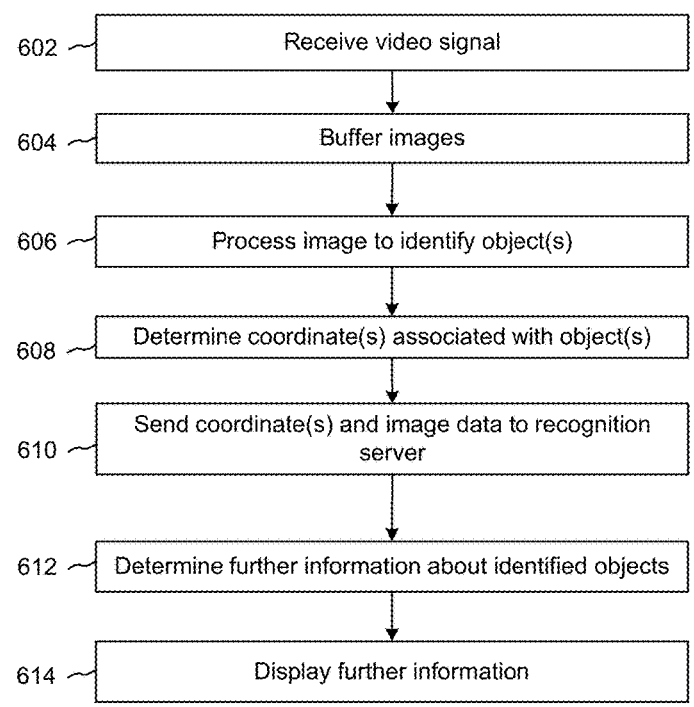
FIGS. 6A-6C illustrate recognizing the presence of objects depicted in image(s) from a video feed.
Figure 6B:
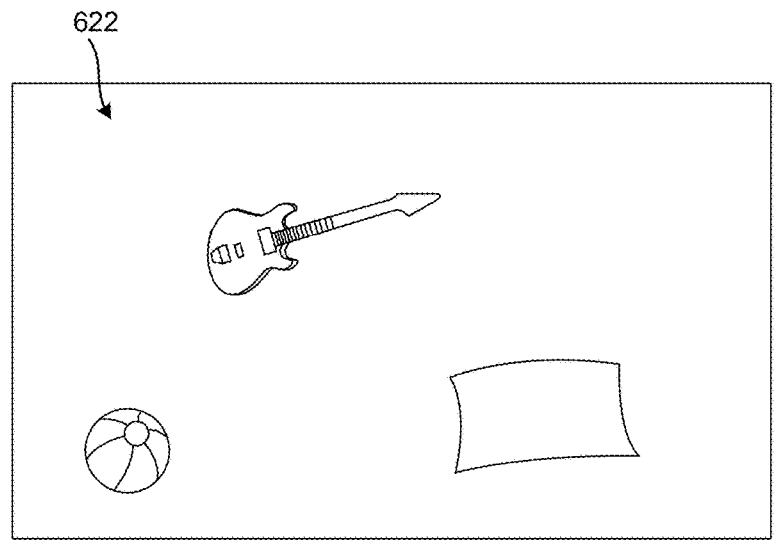
Figure 6C:
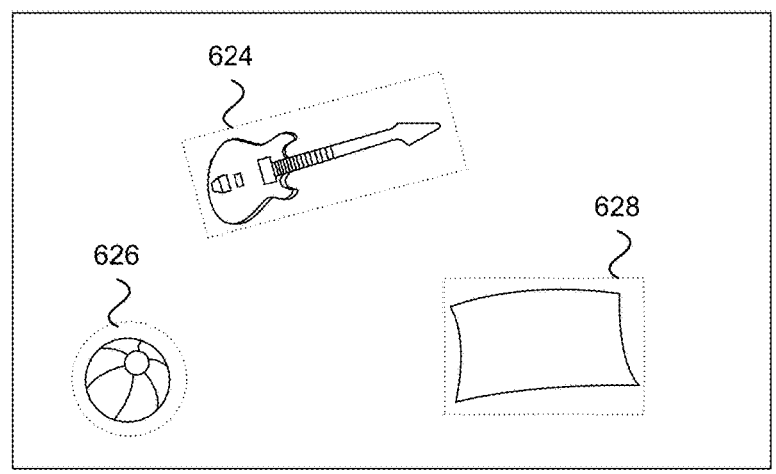

One process for performing the pre-processing is described in reference to FIGS. 6A-6C. In the example discussed in these figures, metadata may include coordinates within an image that are associated with an object that is identified in the image (though not necessarily recognized) by the device 110 as part of pre-processing performed by the device 110. The coordinates may be sent to the recognition server 140b to assist with object recognition. As shown in FIG. 6A, a device may receive (602) a video signal and buffer (604) images or image data from the video signal. The image may include, for example, image 622 shown in FIG. 6B. The device may process an image (606) to identify object(s) in the image. This processing may occur either before or after the image is stored in the buffer. The device may determine (608) coordinate(s) associated with the location of object(s) in the image. For example, the device may identify the presence of three objects in the image of FIG. 6C, where each object is associated with a border (624, 626, 628) defining certain coordinates surrounding the object. Alternatively, the device may determine a single set of coordinates for each object defining a center of the objects. The device may then send (610) coordinates associated with the located object(s) and the image data to the recognition server 140b. The device may then determine (612) further information about the identified objects, for example by receiving object data from the recognition server 140b. The device may then display (614) the further information. The further information may include, for example, supplemental content, an executable function, etc. as discussed above.

Figure 7:
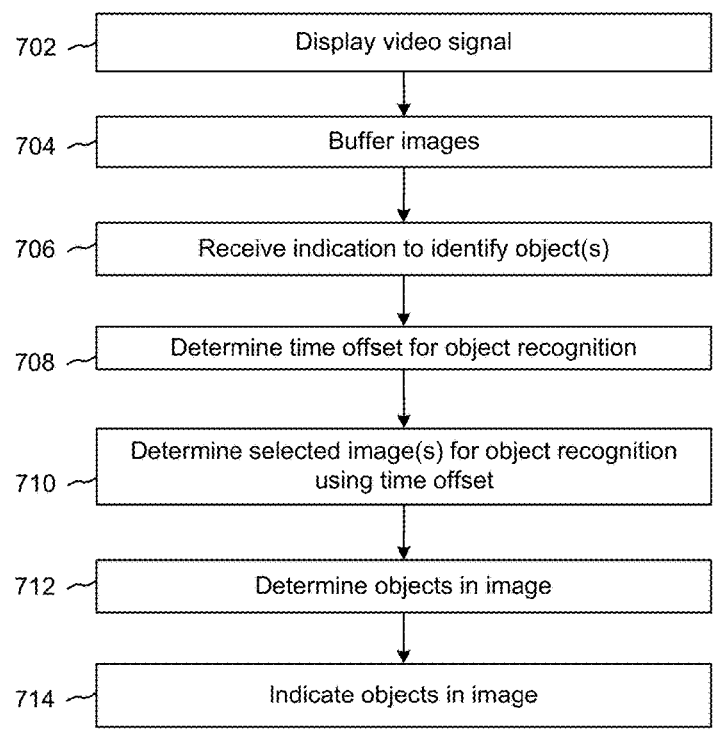
FIG. 7 is a flowchart illustrating image selection for object recognition.

After receiving an indication to perform object recognition, a system may identify a range of images that is located a certain time from the indication, for purposes of object recognition. For example, if an indication is received at time X, the system may identify images from a range between X-2 seconds and X-1 seconds, to account for a delay in a desired image being displayed and the user executing an action to generate the indication. A flowchart for performing such an operation is shown in FIG. 7. A shown, the system (for example through a device 110) may display (702) a video signal and buffer (704) received images from the video signal. The system may receive (706) an indication to identify object(s). The system may determine (708) a backwards time offset for object identification. The system may then determine (710) one or more selected images for object identification using the time offset. The system may then determine (712) object(s) in the image, for example by receiving object data from a recognition server 140b, or by performing object recognition analysis on the image(s). The system may then indicate (714) the object(s) found in the image(s), such as through a user interface on a display.

Figure 8A:
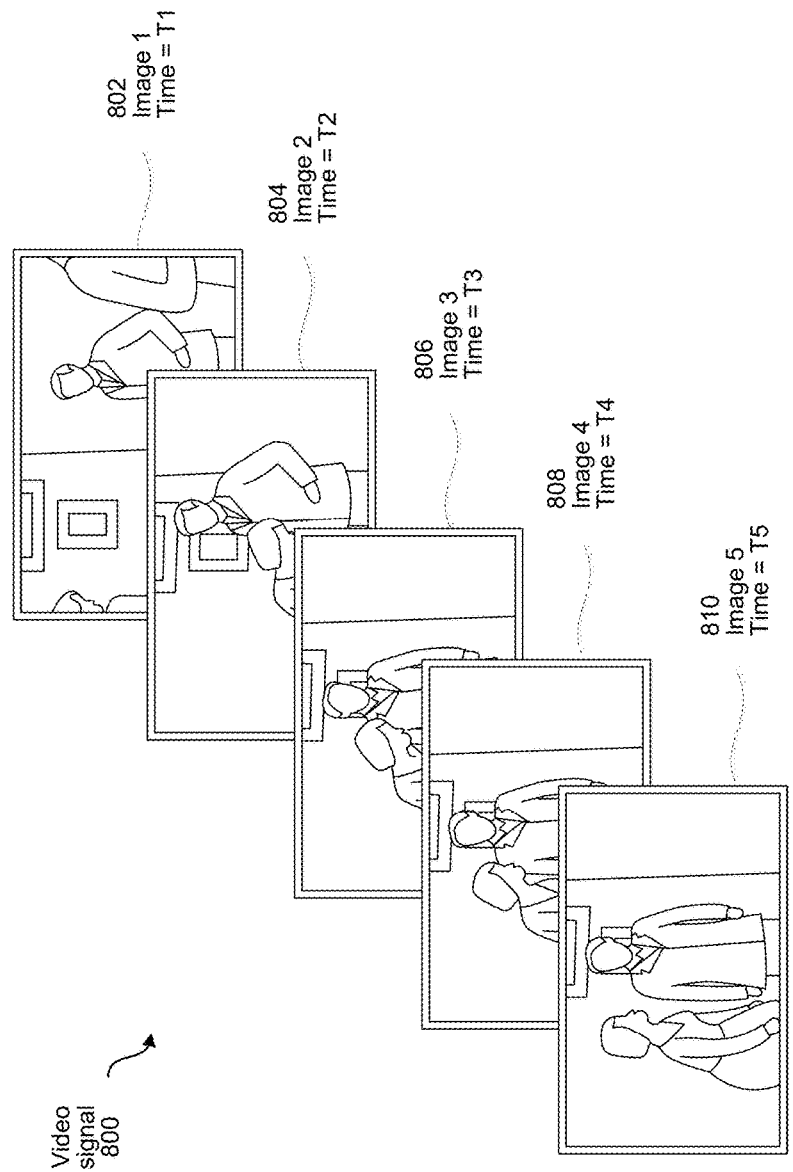
FIGS. 8A-8D illustrate recognizing objects in particular image(s) from a video feed in response to a user indication.

An example of this is shown in FIGS. 8A-8D. As shown in FIG. 8A, a video signal 800 may include a plurality of images. The images may be received by a device in order, starting at image 1 802 and going through to image 5 810. As the images are received they are stored in a buffer and sent to a display for playback to the user. The buffering may occur prior to, during, or after the images are sent to the display. As noted in FIG. 8A, each image may be associated with a time, such as T1 for image 1 802, T2 for image 2 804, and so on. The times may reflect times associated with the video signal (such as video signal timestamps), may reflect times the particular images are received, or some other relative indication of how the images fit into the video signal. As the buffer fills, older images may be overwritten with newer images. For example, if a buffer were configured to store only four images, images 1-4 would be stored in the buffer and when image 5 was received, it would overwrite image 1 in the buffer resulting in images 2-5 being stored in the buffer. This process would continue as the video signal is received and/or played back.

As noted above, if an indication to perform object recognition is received at time T5, the system may look backward in the buffer according to the time offset to identify images to be sent for recognition. For example, the system may be configured, based on the playback rate, to look four time steps backwards. Thus in response to an indication received at time T5, the system may analyze image 1 802 from time T1 as a potential image to send to the recognition server 140b. The length of the backward time offset is configurable, and may depend on a number of considerations such as user settings, determined user response time, previously selected objects during object recognition, etc. The images selected may then provide image data (such as the images themselves, portions thereof, metadata, etc.) to be sent to the recognition server 140b.

Figure 8B:
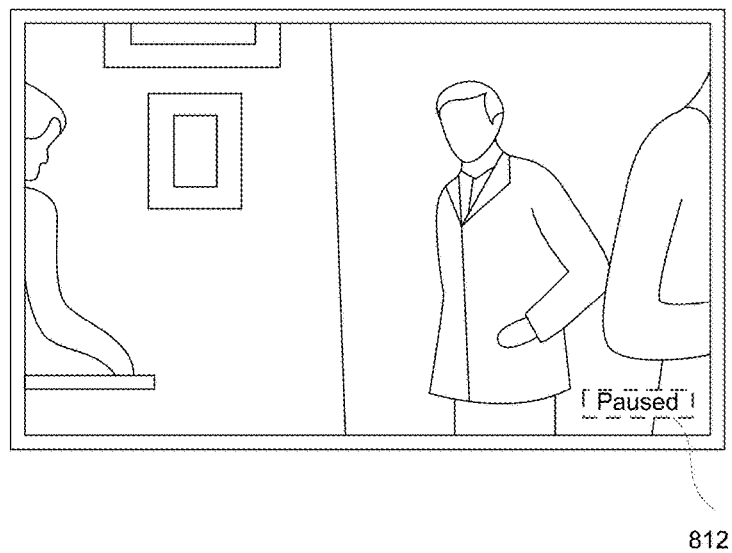

When the indication is received, the device may pause playback of the video series until the object recognition process is completed. The paused image frame may be associated with the receipt of the indication or may be associated an image in the buffer related to how far back the system searches for object recognition purposes. This is illustrated in FIG. 8B. As shown, if an indication is received at time T5, and the backward configuration is set to four time steps, image 1 802 from time T1 may be shown on the paused screen shown in FIG. 8B. The paused screen may also show a graphical element 812 indicating that video playback has been halted. This screen may be displayed while image data is sent to the recognition server 140b, object data is received from the recognition server 140b, and object data is processed for display.

Figure 8C:
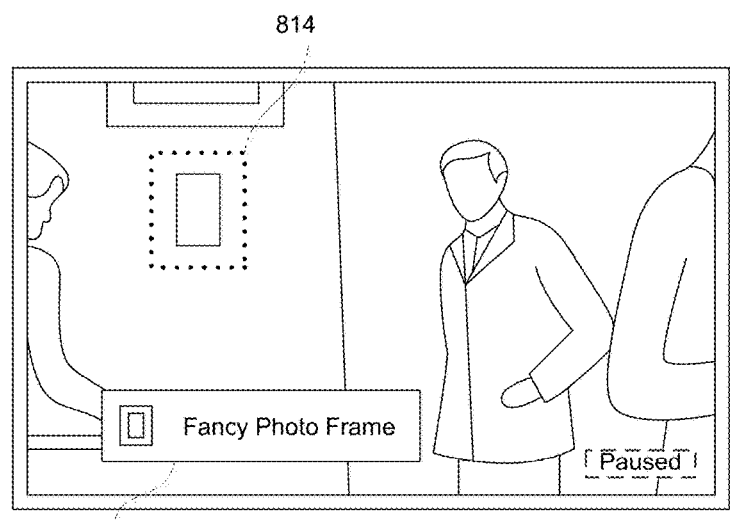

Upon receipt of the object data, the system may display a user interface including the paused image and/or other user interface elements related to the recognized objects, such as the ribbons discussed above. The user interface may also include a visually enhanced representation of the recognized object(s). An example such user interface shown on a display is shown in FIG. 8C. As shown, the display may include the original image 1 and pause indicator 812. The user interface may also include a ribbon 816 indicating a recognized object and certain object data (in this case a picture of the object and a description of the object). The user interface also includes the recognized object highlighted, in this case frame 814, shown in dotted lines to represent highlighting. As noted above, other forms of visual enhancement are also possible.

In another embodiment the user interface may also display ribbons associated with multiple different images from the video signal. Referring again to FIG. 8A, if an indication is received at time T5, the system may select a group of images backward from time T5 (for examples images 1-5) and send image data related to those images to the recognition server 140*b*. The resulting object data received from the recognition server 140*b* may include not only indications of the objects received, but also indications of what images in the feed the objects were found in (and potentially even coordinates associated with those objects for purposes of creating the visually enhanced objects). The user interface shown on the display may thus include ribbons associated with multiple recognized objects, even if those recognized objects are not necessarily shown in the paused frame.

Figure 8D:
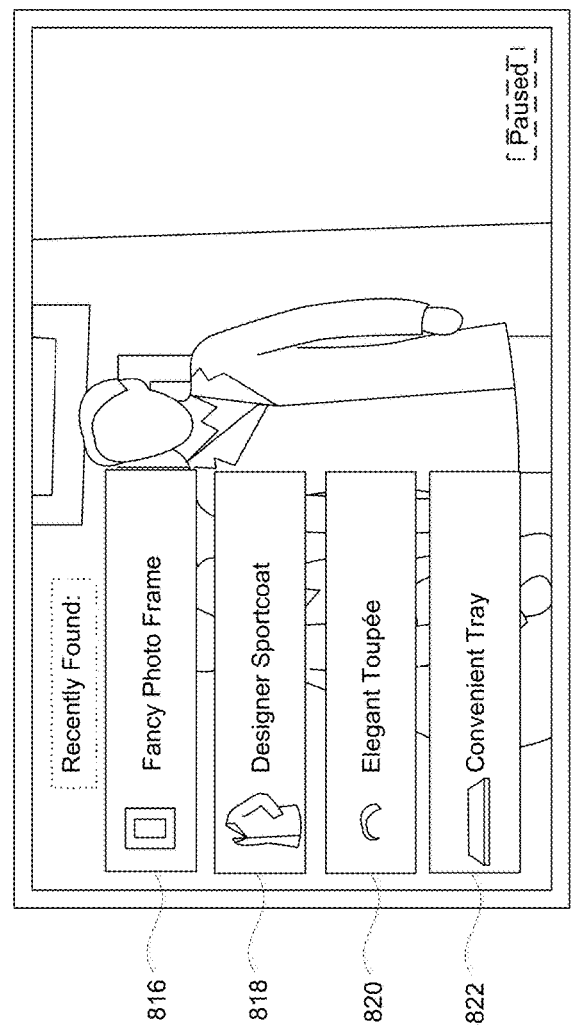

For example, FIG. 8D shows a paused image associated with image 5 in the video signal 800. The user interface of FIG. 8D also shows multiple ribbons 816-822 associated with different objects found in images 1-5, 802-810. These ribbons may be navigable by the user, for example by using remote control 125 or by using a touchscreen of the device 110. The ribbons may be ordered in a number of ways, for example in the order in which they appear in the images of the video signal. The user may then select a desired ribbon to learn more about the underlying object (such as accessing supplemental information about the object) or to perform a certain action (such as purchasing the object or finding other places in a program/video signal where the object is featured). Further details of user navigation of the user interface are described below.

Figure 9B:
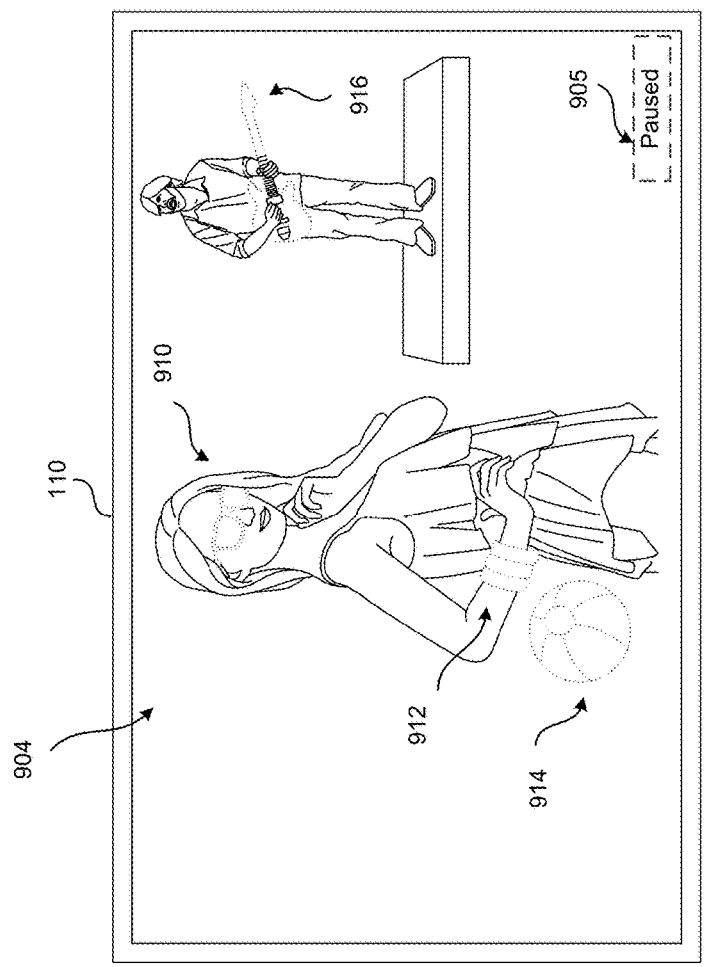

One example user interface is illustrated in FIGS. 9A-9D. As shown in FIG. 9A, a device 110 may display an image 902, which may be part of a video signal. After receiving an indication to perform object recognition, the device 110 may send image data relating to the image 902 to a recognition server 140*b*. The recognition server 140*b* may then send the device 110 object data relating to objects found in image 902. The recognized objects may then be displayed in a visually enhanced manner on a paused image from the video signal. For example, as shown in FIG. 9B, a device 110 may display image 904, which includes a pause indicator 905. The image 904 also includes a number of visually enhanced objects corresponding to the objects recognized by the recognition server 140*b*. Those objects include glasses 910, bracelets 912, ball 914, and guitar 916.

Figure 9D:
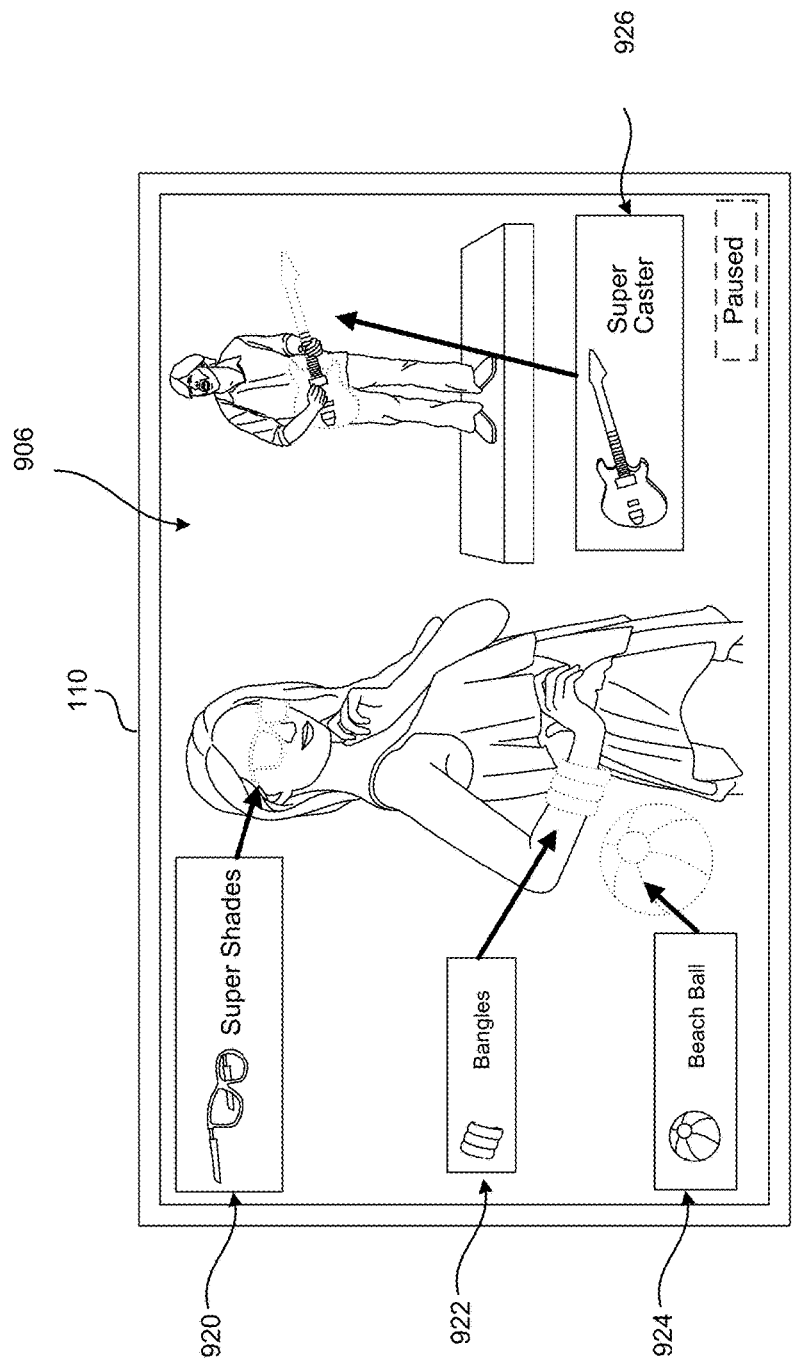

The device 110 may also display an image including user navigable UI elements so that the user may perform additional operations regarding the recognized objects. For example, as shown in FIG. 9C, the device 110 may display image 906, which includes the visually enhanced objects as well as ribbons 920-926, each associated with an object recognized in the image. Each ribbon may include some object data related to the respective object found in the image. The object data displayed in the ribbon may be received from the recognition server 140*b*. For example, as shown in FIG. 9C, each ribbon 920-926 includes a product name for the respective object. As shown in FIG. 9C, the ribbons may be displayed to one side of an image. The ribbons may be ordered based on where the objects appear in the image, based on the size of the objects in the image, or based on other factors, such as a user profile which indicates greater or lesser potential user interest in the objects. Alternatively, as shown in FIG. 9D, the ribbons may be spaced at different locations in the image (and in different sizes) along with arrows or other links to the recognized objects.

Figure 10A:
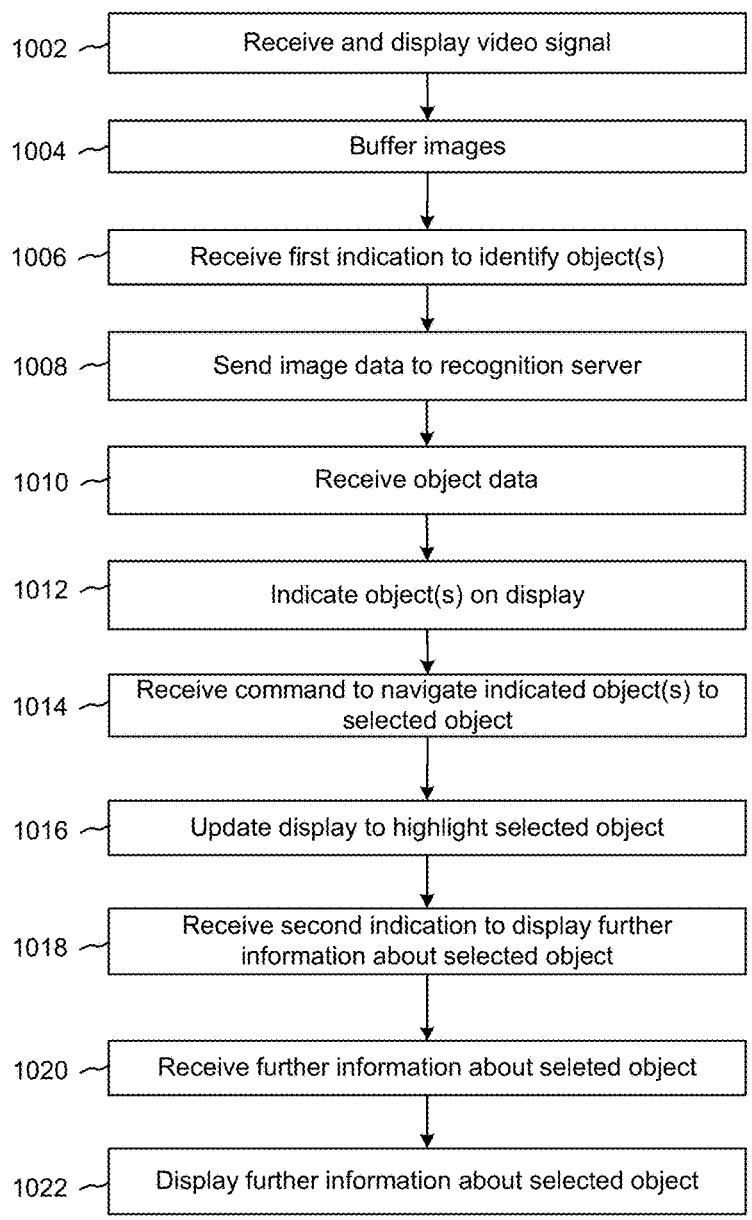
FIGS. 10A-10F illustrate identifying objects in a video feed and user navigation of identified objects using a remote control and television displaying a visual interface.

The user interface showing the ribbons may be operable by a user according to navigation commands received from a remote control, input onto a touchscreen, or the like. As shown in FIG. 10A, a device may receive and display (1002) a video signal and buffer (1004) images from the video signal. The device may receive (1006) an indication to identify object(s) in the video signal. The device may send (1008) image data to a recognition server 140*b*. The device may then receive (1010) object data from the recognition server 140*b* regarding the object(s) represented in the image(s) and recognized from the image data. The device may indicate (1012) recognized objects on the display, for example in a user interface as described. The device may then receive (1014) a command to navigate between indicated object(s) to a selected object. The device may then update (1016) its display to highlight a selected object. The device may then receive (1018) a second indication to display further information about the selected object. The device may receive (1020) further information about the selected object, for example from the recognition server 140*b*, a product server, database, or other source. The device may then display (1022) the further information about the selected object. Using a similar image to that displayed above in reference to FIGS. 9A-9D, the navigation of a user interface is discussed below in reference to FIGS. 10B-10F.

Figure 10B:
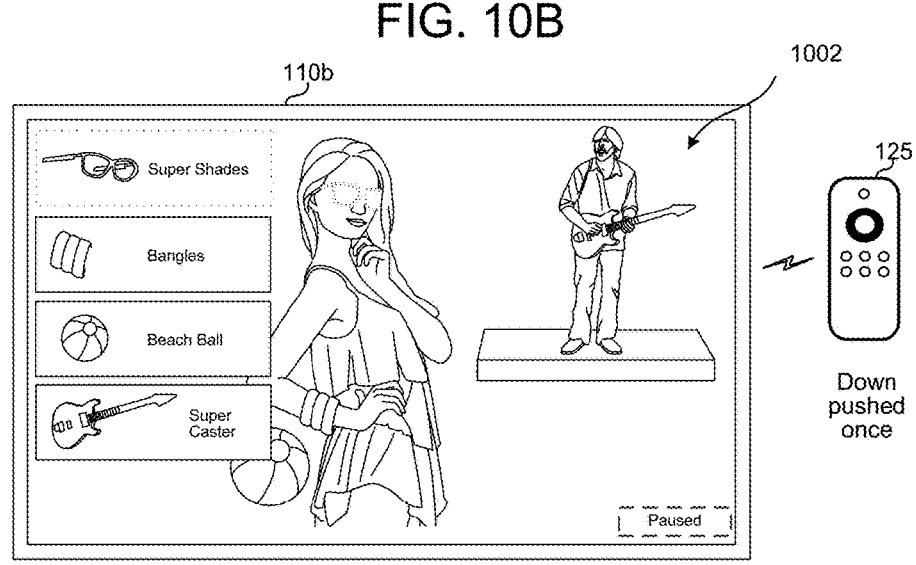
Figure 10C:
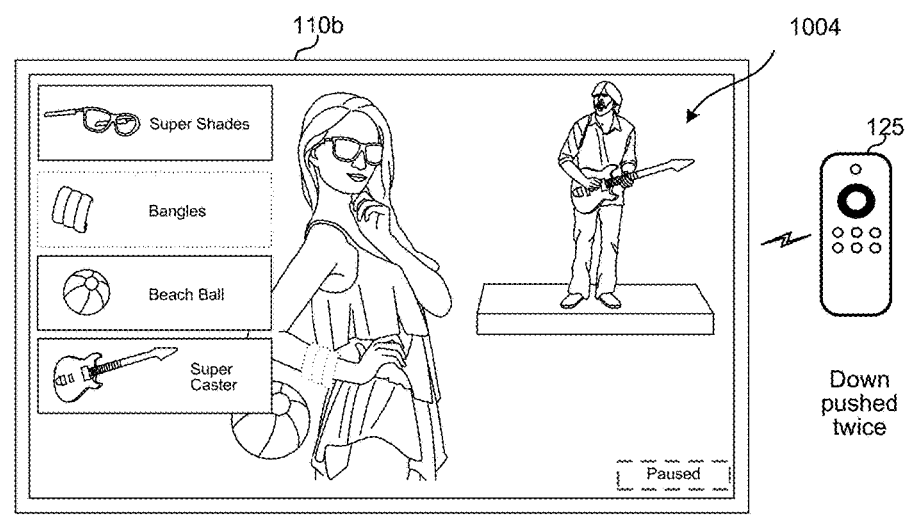
Figure 10D:
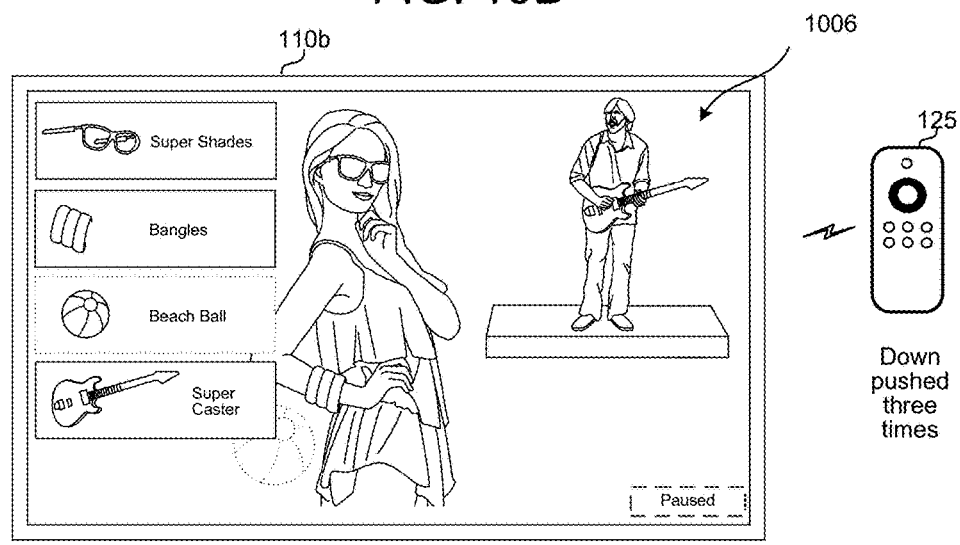
Figure 10E:
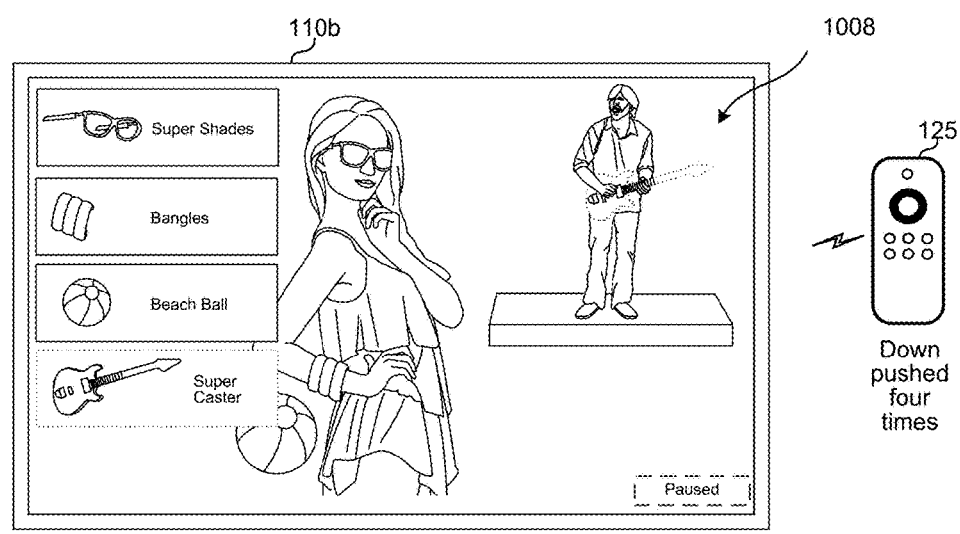

As shown in FIG. 10B, a television 110*b* may display a screen 1002 that includes an original image overlaid with a pause indicator and four ribbons, the ribbons related to objects recognized in the image. The user may operate the remote control 125 to navigate between the ribbons. As shown in FIG. 10B, pressing "down" once on the remote may result in the device selecting the glasses. The device may then highlight the ribbon associated with the glasses. At the same time, the corresponding product, namely the glasses shown in the image, may also be visually enhanced by the device. The user may then navigate to the next ribbon by pressing "down" on the remote control 125 again. The television 110*b* may receive the "down" command from the remote control 125 and in response change the user interface to display screen 1004 of FIG. 10C, where the ribbon for the bracelets is highlighted and the bracelets in the image are also visually enhanced. The glasses, and their ribbon, are no longer be highlighted in 1004 as the selected object has changed from the glasses to the bracelets. Continuing on, another push of the "down" button on the remote 125 may result in screen 1006 of FIG. 10D where the ball and its corresponding ribbon are visually enhanced while another push of the "down" button may result in screen 1008 of FIG. 10E where the guitar and its corresponding ribbon are visually enhanced. FIGS. 10B-10D illustrate steps 1012-1016 of FIG. 10A.

Figure 10F:
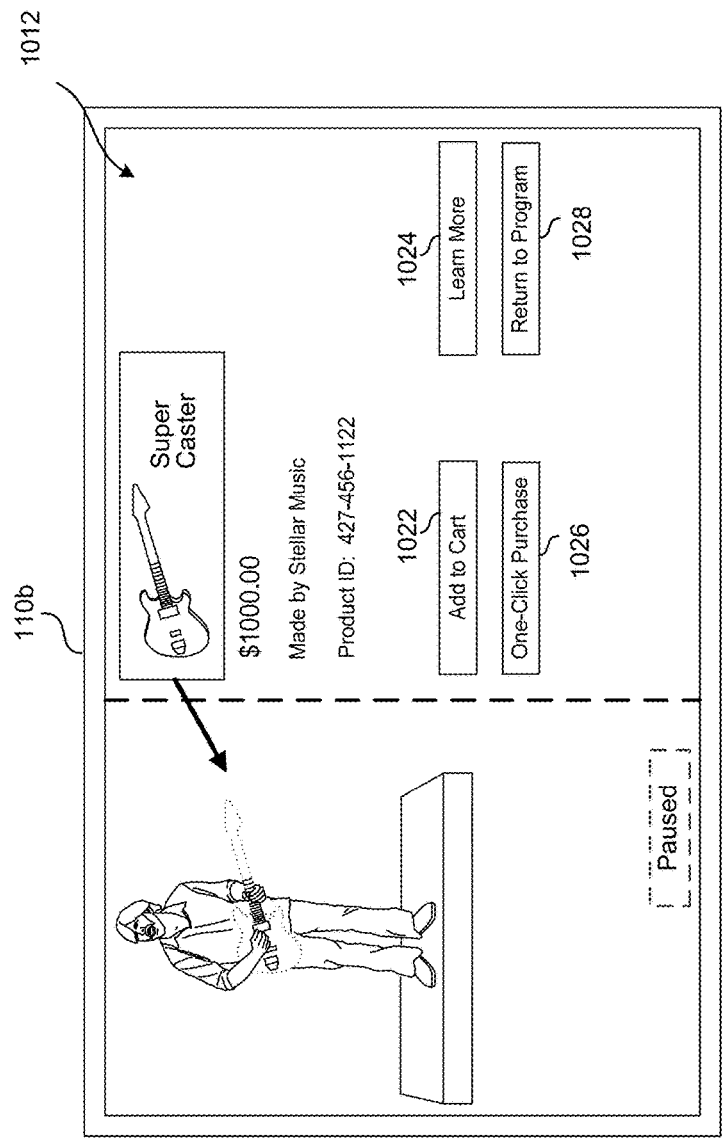

When the user navigates to a desired object, the user may press a "select" or similar button on the remote control 125. The remote control 125 may then send the second indication, which is received (1018) by the device. The device may then send a request for further information about the selected object (in the case of FIG. 10F, the guitar) to another device. The object may be associated with a unique identification (ID) number or other identifier that may be sent to the device 110 from the object recognition server 140*b* as part of the object data. The device may store that unique ID and use the unique ID to request further information about the object from the data source. The device may then receive (1020) further information about the selected object and display (1022) that further information, for example as shown in FIG. 10F. As shown in FIG. 10F, after the further information is obtained, the television may show screen 1012, which may include a portion of the original image including the recognized object (shown on the left of screen 1012) as well as information about the object, including the ribbon, manufacturer, price, etc. on another portion of the screen. The information displayed as part of screen 1012 may have come from the recognition server 140*b* as part of the object data and/or may have come from another information source. For example, the name and image of the produce may have been included in the original object data, but the manufacturer and price may have come from a shopping data source as part of the further information received in step 1020. A user may continue to use the remote control 125 to navigate the user interface shown in screen 1012 to perform additional functions, for example to add the object to a shopping cart (using button 1022), to learn more about the object (1024), to purchase the object using one-click purchasing (1026), or to return to the program (1028). Different option configurations are also possible, such as identifying previous frames showing the object, sending information about the object to a recipient, etc.

Figure 11C:
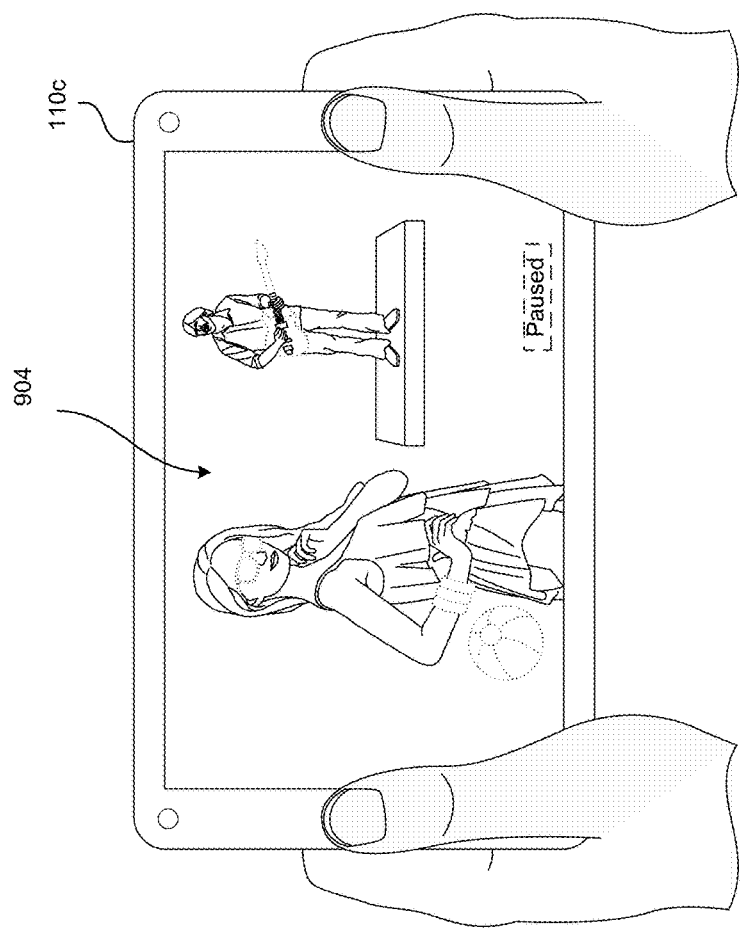
Figure 11E:
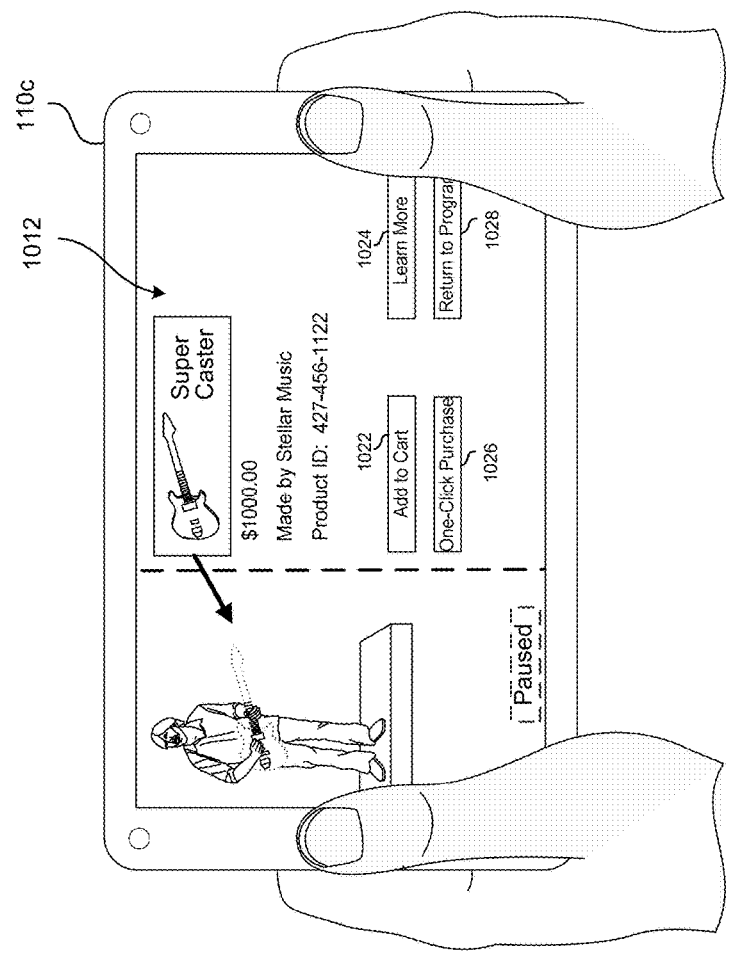

As described above, object recognition from images in a video signal is also possible when the device is touchscreen enabled, such as with a tablet 110*c*. As shown in FIG. 11A, a user may be watching a video signal on a tablet 110*c*. Upon reaching a certain image (here image 902 shown above) the user may indicate a desire for the system to perform object recognition. To make that indication the user may press a dedicated button on the tablet, or perform some operation, such as a gesture, to launch object recognition. As illustrated in FIG. 11B, the gesture may include a prolonged contact from a user's finger, such as moving a thumb from position 1120*a* on a screen bezel to position 1120*b* on a touchscreen surface. In response the device may send image data from a buffer to a recognition server as described above and receive object data back. The device may then update the screen of the tablet to visually enhance the recognized objects, such as shown in screen 904 shown in FIG. 11C. As the tablet 110*c* is touchscreen enabled, the user may navigate the recognized objects by touching the touchscreen in the appropriate location, such as illustrated in FIG. 11D. The device may then obtain and display further information about the selected object (once again, the guitar) and display that screen, such as illustrated in FIG. 11E.

To create the user interface for the screens shown above a device may overlay an image display by injecting code into an image file and displaying the altered image file. Such operations may be allowed by certain operating systems (e.g., Android) and/or certain applications (such as a Chrome browser) or languages (e.g., HTML), etc. Techniques for performing such operations are known in the art.

In one configuration, objects recognized by the system 100 may be associated with some linking factor, such as a user ID, household ID, etc. and stored in a retrievable manner, for example through the user ID. In such a configuration, objects that are recognized by the system 100 may be tracked as associated with the user ID and may be stored, for example, by a remote server, and accessible using a particular notepad function, or other application, for later retrieval. Such a configuration may assist when multiple objects are detected during an object recognition process (for example multiple products, songs, etc.) making it difficult for a user to navigate when viewing a television 110*b*. The recognized objects (or identifying information thereof) may thus be stored for later perusal by a user. Such a configuration may also assist if functionality regarding a found object (e.g., making a telephone call to a recognized number), is difficult in a current viewing environment.

In such an embodiment, the device may use back-end cloud-based information to enhance the user experience when performing object recognition. A first device, such as a television, tablet, etc. may be associated with a user or household ID. That user ID may be linked to a number of other devices. Or, a user may be operating two different devices (either simultaneously or at different times) and be able to access a remote account that is linked to objects recognized during the user's operation of one or more of the devices. For example, a user may perform object recognition while watching a video and the recognized objects may be linked to the user's account or user profile and stored remotely. The user may then access the recognized objects using another network accessible device.

Figure 12A:
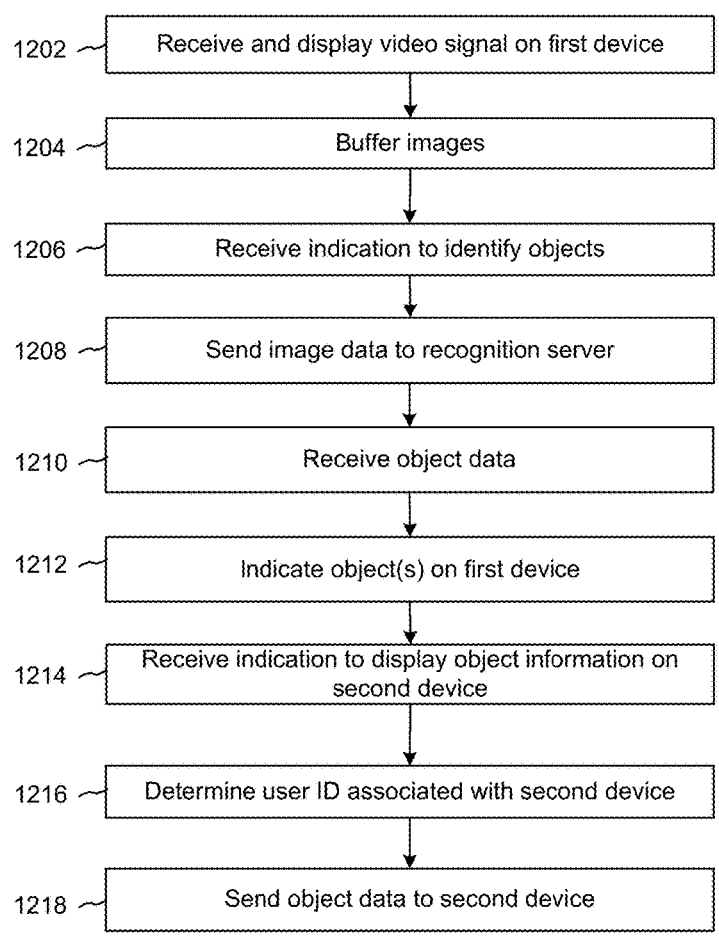

For example, as shown in FIG. 12A, a device may receive and display (1202) images from a video signal and buffer (1204) images from the video signal. The device may receive (1206) an indication to identify object(s) in the video signal. The device may send (1208) image data to a recognition server 140*b*. The device may then receive (1210) object data from the recognition server 140*b* regarding the object(s) represented in the image(s) and recognized from the image data. The device may indicate (1212) recognized objects on a display of a first device. The system (which may include the device or another component of the system) may receive (1214) an indication to display object information on a second device. The system may determine (1216) a user ID associated with the second device and then, if the user ID matches the user ID associated with the first device, send (1218) the object data to the second device. This process is illustrated in FIGS. 12B-12D.

Figure 12B:
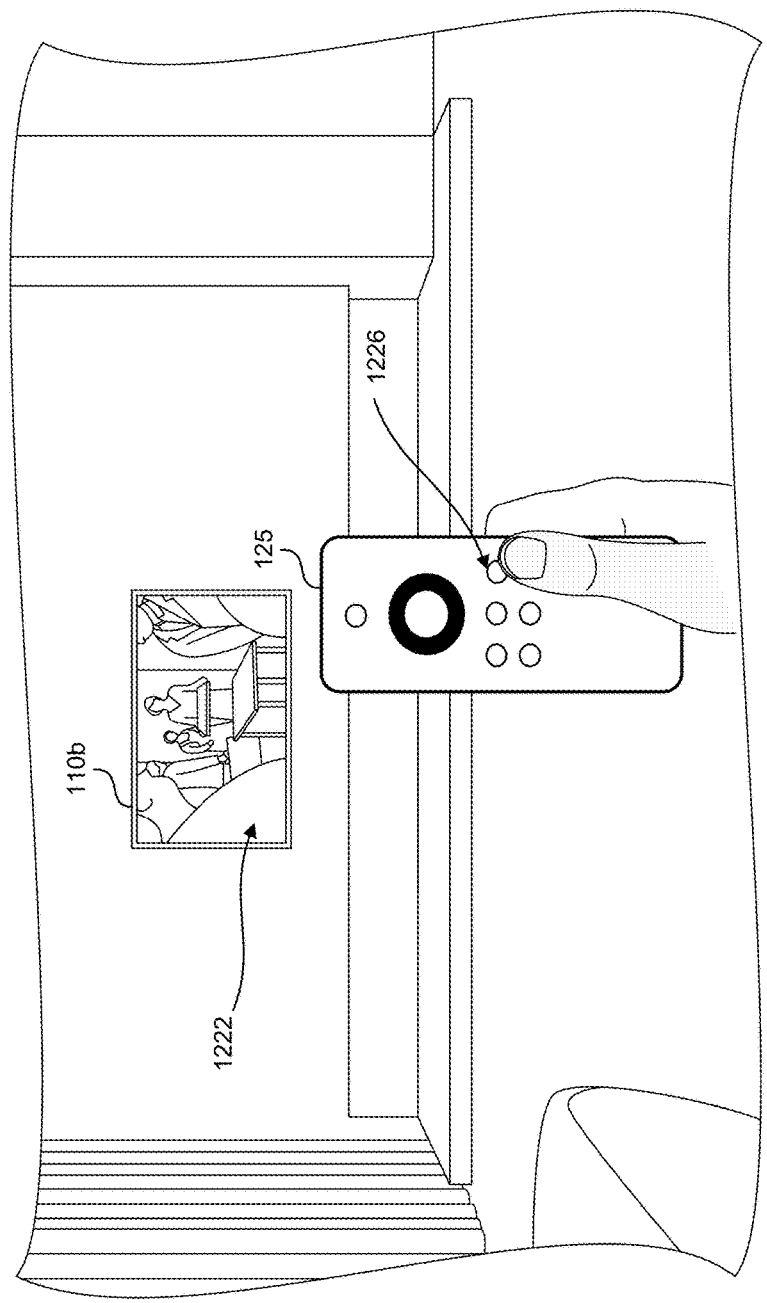

As shown in FIG. 12B, a television 110*b* may be displaying images from a video signal including image 1222. The television may receive (1206) an indication to begin object recognition as a result of a user pushing a dedicated button 1226 on remote control 125 and the remote control 125 sending the resulting indication to the television 110*b*. The television 110*b* may then access the buffer and send (1208) image data to a recognition server 140*b*. The television 110*b* may then receive (1210) the object data and indicate (1212) the object data, for example in screen 1232 of FIG. 12C, which shows a visually enhanced recognized tray and visually enhanced recognized table. The user may then push a second button 1228 on the remote control 125, which results in the second indication (for object data to be sent to a second device) being sent to and received by (1214) the television 110*b*. The television 110*b* may then send the object data to the second device or may send a request to a remote server (such as recognition server 140*b* or other device) to send the data to the second device. For example, as shown in FIG. 12D, the remote server may receive (1252) image data associated with a user ID and may identify (1254) objects in the image data. The remote server may associate (1256) the object(s) with the user ID and send (1258) object information to the second device associated with the user ID.

Figure 12C:
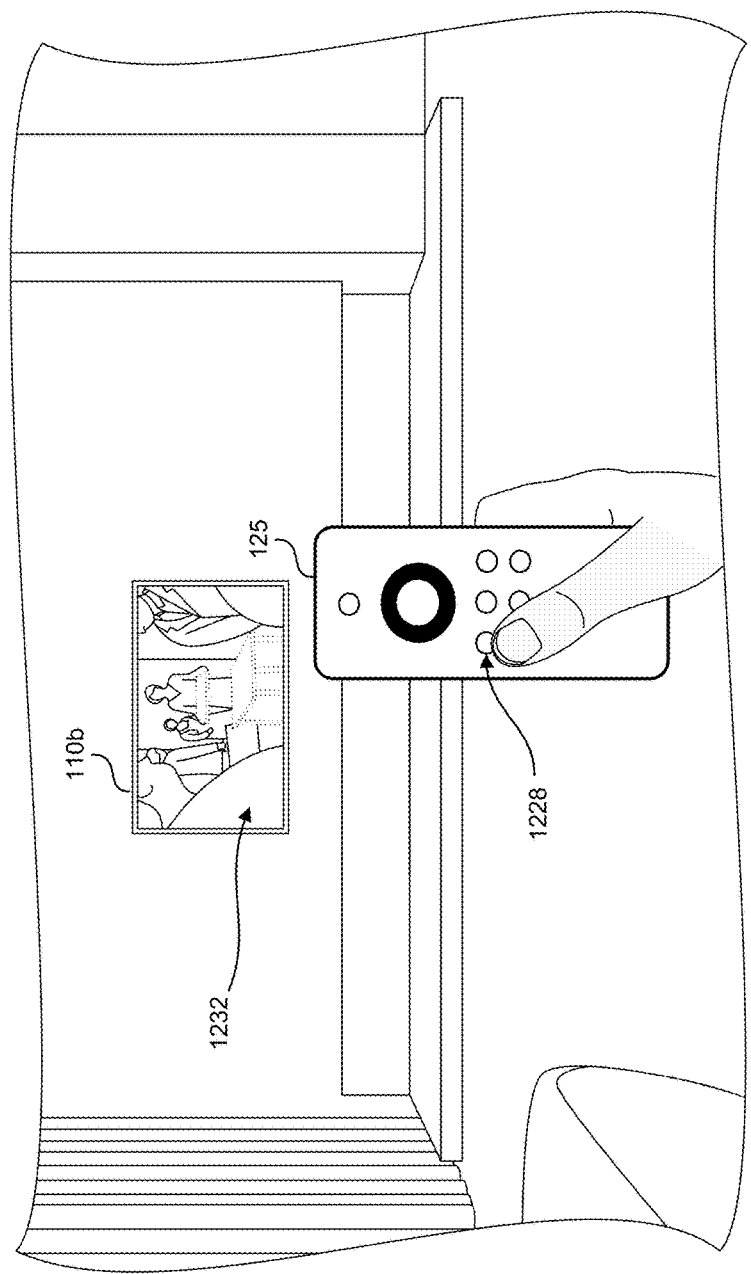
Figure 12D:
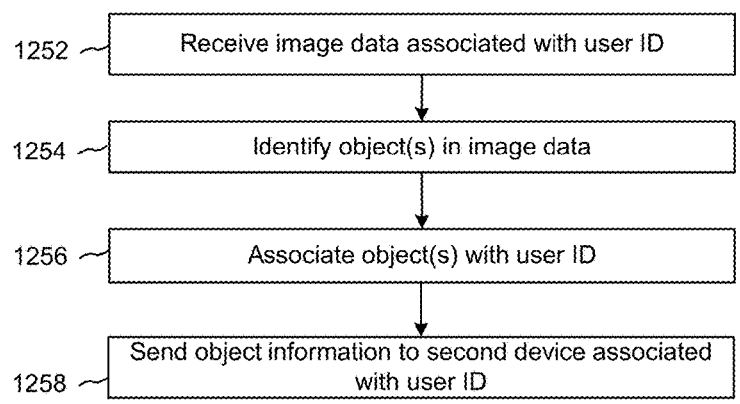

Using the situation illustrated in FIGS. 12B-12C, following object recognition, the user may then access a second device, such as a tablet 110*c* as shown in FIG. 12E to view a screen 1234 that includes the object data, as well as other information about the recognized objects shown in the image 1232 (e.g., the table and tray). For example, the tablet may show buttons 1236 that allow further actions to be performed related to the found objects, in this example the tray and table. In this way the system may allow additional functionality to be displayed on the tablet 110*c*, where user operation of the tablet 110*c* using the touchscreen may be easier than operating the television 110*b* using the remote control 125.

As noted above, object information may be stored for later retrieval. The organization of the stored object information may depend on the objects found. While all object information may be made available through a single interface (for example, an object notebook or the like), different objects may be accessed in different ways depending on the objects. For example, a purchasable object may be associated with a shopping application using the individual product identification number associated with the recognized object, recognized music may be associated with a music application (or device), a recognized telephone number may be associated with a telephone application (or device), a recognized uniform resource locator (URL) may be associated with an internet browsing application (or device), or the like. Object information may also be organized by program. For example, all objects recognized in a certain program of the video signal may be organized together so the user may later browse those objects together. For example, the user may browse all objects recognized in season 1, episode 3 of "Mozart in the Jungle." The user may also select which object(s) to save, thus creating a save-for-later "wish list" or similar record rather than the system saving information about every recognized object. In this manner the user may customize what objects are saved for later reference. When later browsing an object list, the system may redisplay portions of the video signal (including image and/or audio data) from where the object was recognized, thus improving user recall of the object. Thus individual object data may be stored with other information, such as a timestamp (which may relate to a broadcast time, viewing time, or other time), associated program, product/object ID, user ID, video signal information, etc.

Figure 13:
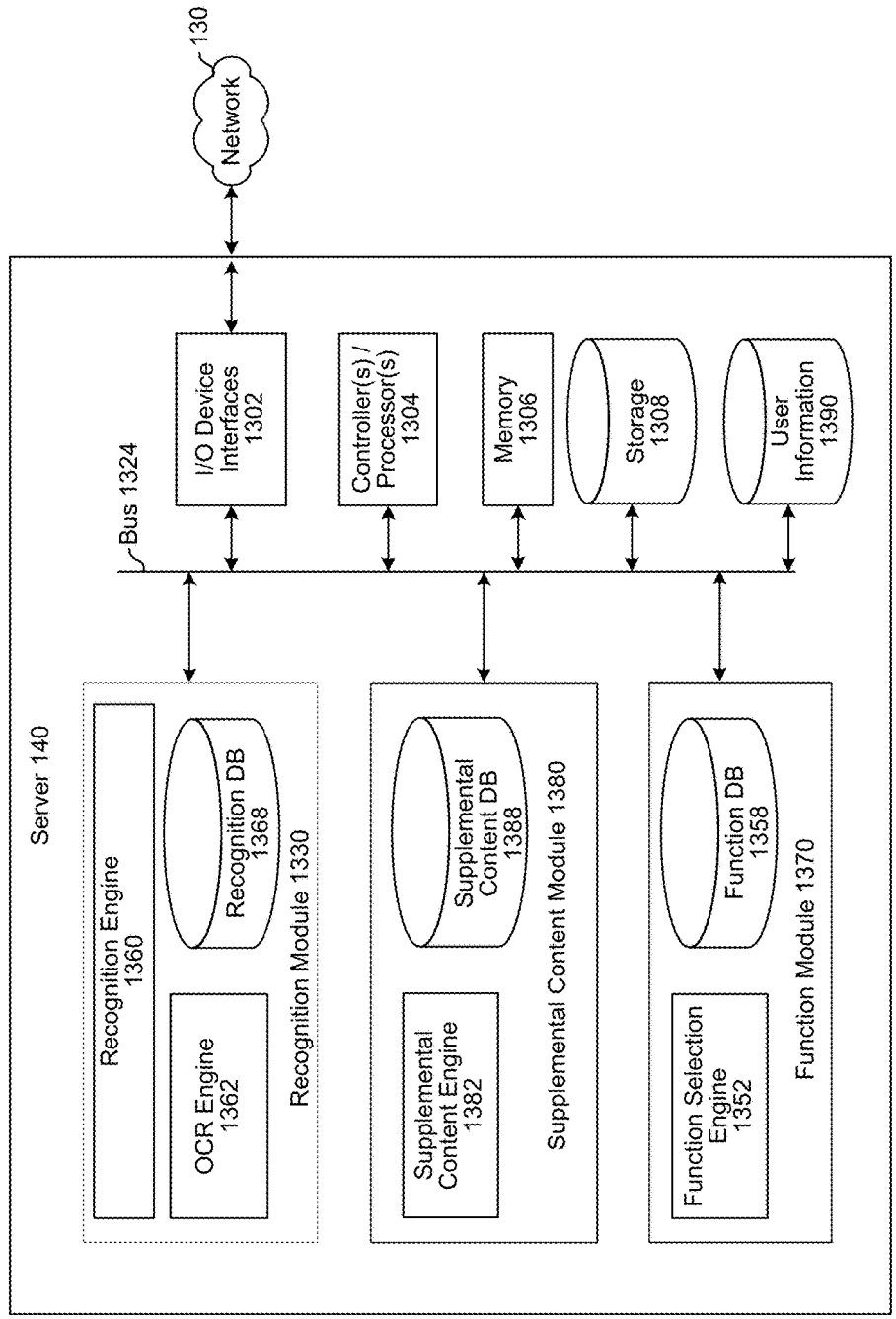
FIG. 13 illustrates example components that may be included in a server of the system.
Figure 14:
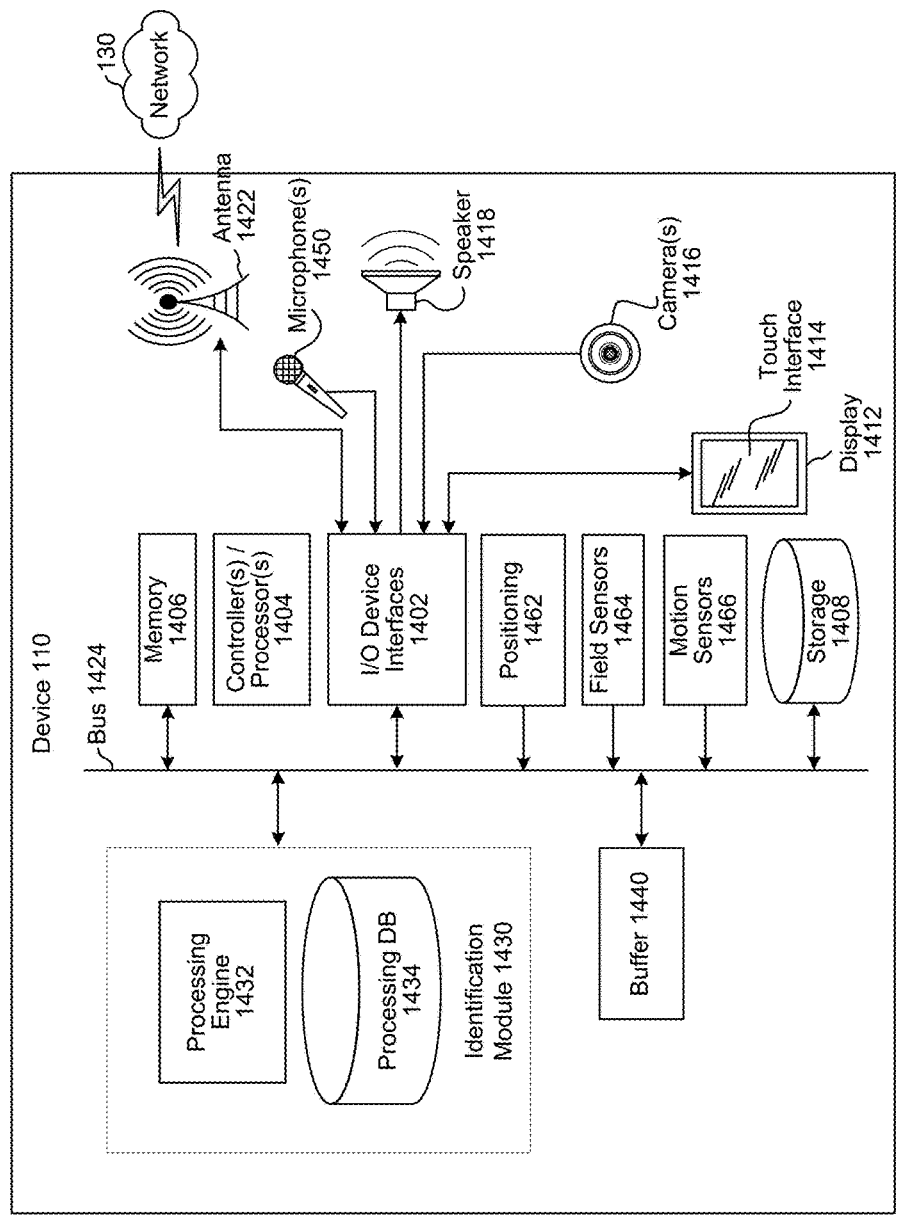
FIG. 14 illustrates example components that may be included in a device of the system.

FIGS. 13 and 14 illustrate block diagrams conceptually illustrating components of the system 100. Depending upon how the system 100 is structured, some of components shown in FIG. 13 as part of server 140 may include included in the device 110, and some of the components shown in FIG. 14 as part of device 110 may be included in the server 140. In operation, the system 100 may include computer-readable and computer-executable instructions that reside in storage 1308/1408 on the device 110 or server 140. Device 110 and server 140 may be any computing devices, or a collection of computing devices, and are referred to herein as "mobile device" and "server" to facilitate understanding based upon an example system architecture. Other arrangements are possible, such as device 110 being one-or-more fixed (non-mobile) terminals.

Each of the device 110 and the server 140 may include one or more controllers/processors 1304/1404 comprising one-or-more central processing units (CPUs) for processing data and computer-readable instructions, and a memory 1306/1406 for storing data and instructions. The memory 1306/1406 may include volatile random access memory (RAM), non-volatile read only memory (ROM), non-volatile magnetoresistive (MRAM) and/or other types of memory. The device 110 and the server 140 may also include a data storage component 1308/1408 for storing data and processor-executable instructions. The data storage component 1308/1408 may include one or more non-volatile storage types such as magnetic storage, optical storage, solid-state storage, etc. The device 110 and server 140 may also be connected to a removable or external non-volatile memory and/or storage (such as a removable memory card, memory key drive, networked storage, etc.) through the input/output device interfaces 1302/1402.

Executable instructions for operating the device 110, the server 140, and their various components may be executed by the controller(s)/processor(s) 1304/1404, using the memory 1306/1406 as temporary "working" storage at runtime. The executable instructions may be stored in a non-transitory manner in non-volatile memory 1306/1406, storage 1308/1408, or an external device. Alternatively, some or all of the executable instructions may be embedded in hardware or firmware in addition to or instead of software.

Referring to FIG. 13, the server 140 is connected to a network 130 via input/output device interfaces 1302. The input/output device interfaces 1302 may also include an interface for an external peripheral device connection such as universal serial bus (USB), FireWire, Thunderbolt or other connection protocol. The input/output device interfaces 1302 may connect to one or more networks 130 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The server 140 may include an address/data bus 1324 for conveying data among components of the server 140. Each component within the server 140 may also be directly connected to other components in addition to (or instead of) being connected to other components across the bus 1324.

The server 140 may further include a recognition module 1330 that performs recognition on content captured by or available to the device 110, such as the recognition operations discussed above. For example, the device 110 may send image data (either raw or processed) to the server 140 for the server to perform recognition on the image data. The image data may include single still images, a video feed, or portions of still images or a video feed, such as isolated or processed portions thereof. The recognition module 1330 may include a variety of components, including an image recognition engine 1360, OCR engine 1362, recognition database 1330, or other components such as an audio recognition module (not shown) or the like. The recognition database 1368 may store data used by the various engines/processors of the recognition module 1330 such as image data, audio data, OCR language models, OCR dictionaries, and the like.

The recognition module 1330 may also be configured to perform recognition on audio portions of a video signal. For example, if a particular song, jingle, or other musical composition is included in a video signal discussed above, the system (for example using the recognition engine 1360) may be configured to recognize the musical composition and interact with other components of the system (the supplemental content module 1380, the function module 1370, the device 110, etc.) to display information regarding the musical composition, and allow the user to perform additional actions regarding the musical composition (for example, adding it to a playlist, purchasing a song, etc.). The recognition module 1330 may also be configured to recognize words included in audio (even if not part of a musical composition). Those recognized words may also be processed by the system to determine additional information/functionality based on those words and to display those for further user navigation/selection. For example, if an audio portion of the video signal mentions a specific travel destination, the system may be configured to recognize the location, and in response to a user indication, display navigable information regarding the destination. Such recognizable items in an audio signal (music, locations, etc.) may also be considered recognizable objects as described above. Information about such objects may also be displayed and navigated as described above in reference to objects found in image portions of the video signal. The recognition module 1330 may communicate with the supplemental content module 1380.

The supplemental content module 1380 may identify supplemental content related to objects recognized by the recognition module 1330. Such supplemental content may include other content or information related to objects recognized by the recognition module 1330 where the supplemental content is not necessarily included in the specific content item in which the recognized object is found. For example, if a landmark is recognized in a video, supplemental content may include general information about the landmark, other images of the landmark, calendar entries of a user corresponding to visits to the city in which the landmark is located, social media content discussing the landmark or the landmark's location where the social media content is associated with the user (for example, posts by the user's friends or family), or the like. In another example, if a specific song is recognized in audio data, supplemental content may include the name of the composer of the song, a band name, an album title, other versions of the song, a list of social media contacts who have the song in their music collections, concert dates for the band, etc. The supplemental content engine 1382 may cross reference an identified object with one or more information sources, including a supplemental content database 1388, which may include database entries tracking certain potential recognized objects or object classes (e.g., person, place, song, product, etc.) and their corresponding supplemental content or potential supplemental content types. Given the vast amount of information that may qualify as supplemental content, the supplemental content module 1380 may communicate with a multitude of other information sources including those located remotely from the server 140. For example, the supplemental content module 1380 may communicate with Internet sources, retailers, library catalogs, etc. to identify supplemental content. Once supplemental content related to a recognized object is identified, it may be sent to the device 110.

In addition to supplemental content, the recognition system may determine one or more potential user-selectable function based on recognized objects. The-user selectable function causes the system (upon selection by the user) to perform some action based on the particular recognized object. Such potential user-selectable functions may be presented to the user on the mobile device, for example using the ribbons discussed above. The function module 1370 operates to select one or more functions to present to a user, for example in ribbons 244, 264, or 282. The functions may be based on objects recognized in a content item stored on or otherwise accessible to the device 110. Selection of one of the functions by the user leads to execution of the function by the device 110, server 140, or other device. Accordingly, the function module 1370 may communicate with one or more other components such as application modules of the device 110, other servers, etc. For example, if a function module 1370 determines that based on recognition of a telephone number by recognition module 1330, the user should be presented with options to dial a telephone number or add the number to a contact, the function module 1370 may send a command to a telephone application of a device 110 if the user selects the function to make a call, or the function module 1370 may send a command to a contact module (located either at the device 110 or elsewhere) if the user selects the function to add to a contact. The function module 1370 may communicate with the supplemental content module 1380 to offer the user different functions based on identified supplemental content. The function module may include components such as a function selection engine 1352 which analyzes the recognition and supplemental content data to select one or more functions to offer to a user and their relative priority and a function database 1358 which stores information used by the function selection engine 1352. Although multiple storage entities are illustrated, the various storage/databases 1358, 1368, 1388, and/or 1308 may be combined in various configurations.

The server 140 may also include a user information database 1390. The user information database 1390 may include user identification information (such as user ID numbers), user profile information, and other user information that may be used in sharing object data between devices, for example as described above in reference to FIGS. 12A-12E.

Referring to FIG. 14, the system 100 may include a variety of sensors such as those illustrated with device 110. Among the sensors are an audio capture component such as microphone(s) 1450, an image and/or video capture component such as camera(s) 1416, a touch interface 1414, an antenna 1422, global positioning sensors 1462, field sensors 1464 (e.g., a 3-axis magnetometer, a gravity sensor), and motion sensors 1466 (e.g., a 3-axis accelerometer, a 3-axis gyroscope). The device 110 may also include one or more buttons 202 (not shown). Several of each of these components may be included. Also, although shown as integrated within device 110, some or parts of the various sensors may be external to device 110 and accessed through input/output device interfaces 1402.

The antenna 1422 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc. The antenna 1422 may also be capable of receiving television or other image broadcast signals.

The audio capture component may be, for example, a microphone 1450 or array of microphones, a wired headset (not illustrated), a wireless headset (not illustrated), etc. If an array of microphones is included, approximate distance to a sound's point of origin may be performed acoustic localization based on time and amplitude differences between sounds captured by different microphones of the array.

The touch interface 1414 may be integrated with a surface of a display 1412 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 1462 provides an interface for acquiring location information, such as information from satellite geographic positioning system(s). For example, the global positioning module 1462 may include a Global Positioning System (GPS) receiver and/or a Global Navigation Satellite System (GLONASS) receiver. The global positioning module 1462 may also acquire location-based information using other radio sources (e.g., via antenna 1422), such as mapping services that triangulate off of known WiFi service set identifiers (SSIDs) or cellular towers within range of the device 110.

The field sensor module 1464 provides directional data. The field sensor module 864 may include a 3-axis magnetometer that measures magnetic fields and may serve as a compass. The field sensor module 1464 may also include a dedicated gravity sensor to determine up-and-down.

The motion sensor module 1466 provides inertial data, and may include 3-axis accelerometer and a 3-axis gyroscope.

Examples of other sensors include an electronic thermometer to measure ambient temperature and a proximity sensor to detect whether there is an object within a certain distance of the device 110.

Sensors may be communicatively coupled with other components of system 100 via input/output (I/O) device interfaces 1402 and/or via an address/data bus 1424. The address/data bus 1424 conveys data among components of the device 110. Each component within the device 110 may also be directly connected to other components in addition to (or instead of) being connected to other components across the bus 1424.

The I/O device interfaces 1402 may connect to a variety of components and networks. Among other things, the I/O device interfaces 1402 may include an interface for an external peripheral device connection such as universal serial bus (USB), FireWire, Thunderbolt or other connection protocol. The input/output device interfaces 1402 may also support a variety of networks via an Ethernet port and antenna 1422.

The device 110 may also include a video output component for displaying images, such as display 1412. The video output component may be a display of any suitable technology, such as a liquid crystal display, an organic light emitting diode display, electronic paper, an electrochromic display, a pico projector, etc. The video output component may be integrated into the device 110 or may be separate.

The device 110 may also include an audio output component such as a speaker 1418, a wired headset (not illustrated), or a wireless headset (not illustrated). Other output devices include a haptic effect generator (not illustrated). The haptic effect generator may be of any haptic technology, including technologies to vibrate the entire device 110 (e.g., electromagnetic technologies such as vibratory motor or a coil with a central mass) and/or may comprise technologies allowing the haptic effect to be localized to a position of the touch interface 1414, such as electroactive polymers, piezoelectrics, electrostatics, subsonic audio wave surface actuation, etc.

As discussed above, device 110 includes controller(s)/processors 1404, memory 1406, and storage 1408. In addition, the mobile device may include an identification module 1430 which may comprise processor-executable instructions stored in storage 1408 to be executed by controller(s)/processor(s) 1404 (e.g., software, firmware), hardware, or some combination thereof. For example, components of the identification module 1430 may be part of a software application running in the foreground and/or background on the device 110.

The device 110 may include buffer 1440 which may store portions of the received video signal as discussed above. The buffer 1440 may store images, image data, or audio portions of the video signal. Buffered audio may also be processed by the system to recognize audio objects, as described above with regard to the recognition module 1330. The buffer 1440 may be a set memory size (for example a certain number of MB, GB, etc.) or may be configured to store a certain number of video frames and their corresponding audio data based on the configuration of the video signal. For example, the buffer 1440 may be configured to hold 2 minutes of the video signal, so the size of the buffer may increase or decrease depending on how much memory each frame of video signal requires (for example if the video signal is a standard definition signal, high definition signal, 4K signal, MPEG-4 signal, etc.). In such a configuration other memory (for example, certain portions of memory 1406) may be allocated to the buffer 1440 as needed based on the configuration of the video signal. In other configurations the size of the buffer 1440 may be configured by the device 110, the user 102, or by some other component of the system 100.

The identification module 1430 may include a processing engine 1432 and processing database 1434. In one example, the processing engine 1432 may perform a certain amount of processing of image data prior to sending to the server 140. For example, if a server 140 was configured for OCR processing of the image data, the processing engine 1432 may convert color image data to black and white image data e.g., binarizing) to both assist with OCR processing and reduce the bandwidth consumed when sending image data to the server. The processing engine 1432 may also identify sections of image data including objects and isolate those portions for sending to the server 140 to reduce bandwidth usage and/or speed recognition processing, for example as described above and in reference to FIGS. 6A-6C. Such pre-processing may be performed on images incoming from a video signal and/or images stored in the buffer 1440. Pre-processing may also be performed on audio portions of the video signal stored in the buffer. The processing engine may also perform operations to assist the device 110 in selecting images and image data to be sent to a recognition server 140b for processing as described above and in reference to FIG. 5. The processing database 1434 may store data used by the processing engine 1432.

Although not illustrated, the device 110 may also include a function module, such as function module 1370 configured to determine, select, and/or potentially execute potential user-selected functions based on recognized objects found in image data, such as that described above.

Referring to FIG. 15, different components of the system 100 may be connected over a network 130. For example, the set-to box 110a, television 110b, tablet computer 110c, smartphone 110d, augmented reality (AR) glasses 110e, headless device 110f, may all process and/or display a video signal and/or receive indications from a user to initiate object recognition as described above in reference to any device 110 or other portion of the system 100. A remote control 125 may be connected to devices 110 either through a direct wireless connection or through network 130. In the same system, server(s) 140 may send a video signal, perform object recognition processing, provide user information, provide supplemental content/functionality, etc. A same server or cluster of servers 140 may provide these or other functions to support the devices individually according to their individual capabilities within a same system. Other device examples may also be included in the system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
receiving a plurality of video frames of a television program from a broadcast source;
displaying the television program on a television, comprising displaying a portion of the television program on the television;
storing, in a memory buffer, at least thirty seconds worth of video frames associated with the portion of the television program;
receiving, during a first time period, a first indication from a remote control to identify objects represented in the portion of the television program previously displayed;
pausing the displaying of the television program;
determining a first video frame from the video frames stored in the memory buffer, the first video frame being determined based on at least one of the first video frame satisfying in-focus criteria or the first video frame being received more than a threshold amount of time prior to receipt of the first indication;
determining image data associated with the first video frame;
determining, using the image data, that the first video frame comprises a first item for sale in an online store;

determining, using the image data, that the first video frame comprises a second item for sale in an online store;
determining a first identification number associated with the first item, the first identification number associated with the online store;
determining a second identification number associated with the second item, the second identification number associated with the online store;
displaying a first display on the television, the first display comprising the first video frame, a visually enhanced representation of the first item and a visually enhanced representation of the second item;
receiving a second indication from the remote control to display further information about the first item;
determining first information about the first item using the first identification number; and
displaying the first information on the television.

2. The method of claim 1, the method further comprising:
receiving the first indication from a dedicated button on the remote control;
determining a user identification number, the user identification number associated with the online store and associated with the remote control; and
associating the user identification number with the first item and the second item.

3. The method of claim 1, the method further comprising:
determining, prior to the first time period and using contents of the memory buffer, that the first video frame comprises a first object associated with a first coordinate within the first video frame, the first coordinate comprising a pixel location within the first video frame overlapping with the first object; and
determining, after the first time period and using the image data and the first coordinate, that the first object is the first item.

4. A method comprising:
receiving a video signal representing a plurality of images;
storing data corresponding to the plurality of images in at least one memory;
sending, during a first time period, the plurality of images to a display component;
receiving a first indication to identify one or more objects in the video signal, the first indication not specifying a particular object;
determining, in response to receiving the first indication, first image data corresponding to a first image of the plurality of images, the first image data being determined based on at least one of the first image satisfying in-focus criteria or the first image data being received at a threshold time prior to receipt of the first indication;
determining that a first object is represented in the first image data;
determining first data describing the first object; and
outputting the first data.

5. The method of claim 4, wherein determining that the first object is represented in the first image data comprises:
processing the first image data to identify a location of the first object in the first image;
sending, to a remote device, the first image data and the location; and
receiving, from the remote device, a second indication that the first object is represented in the first image data.

6. The method of claim 4, further comprising:
receiving an identification number associated with the first object;
sending the identification number to a remote device; and
receiving the first data from the remote device.

7. The method of claim 6, further comprising:
determining a user account associated with the first indication; and
associating the first identification number with the user account.

8. The method of claim 4, further comprising:
sending the plurality of images to a display; and
receiving the first indication from a remote control.

9. The method of claim 4, further comprising:
receiving a second indication to display further information about the first object;
determining second data describing the first object; and
outputting the second data.

10. The method of claim 4, further comprising outputting the first data in a manner overlaying the first image.

11. The method of claim 4, further comprising, prior to outputting the first data, displaying a visually enhanced representation of the first object.

12. The method of claim 4, further comprising displaying information regarding purchasing the first object.

13. A computing system comprising:
at least one processor;
at least one memory including instructions operable to be executed by the at least one processor to cause the computing system to perform a set of actions comprising:
receiving a video signal representing a plurality of images;
storing data corresponding to the plurality of images in at least one memory;
sending, during a first time period, the plurality of images to a display component;
receiving a first indication to identify one or more objects in the video signal, the first indication not specifying a particular object;
determining, in response to receiving the first indication, first image data corresponding to a first image of the plurality of images, the first image data being determined based on at least one of the first image satisfying in-focus criteria or the first image data being received at a threshold time prior to receipt of the first indication;
determining that a first object is represented in the first image data;
determining first data describing the first object; and
outputting the first data.

14. The computing system of claim 13, wherein determining that the first object is represented in the first image data comprises:
processing the first image data to identify a location of the first object in the first image;
sending, to a remote device, the first image data and the location; and
receiving, from the remote device, a second indication that the first object is represented in the first image data.

15. The computing system of claim 13, the set of actions further comprising:
receiving an identification number associated with the first object;
sending the identification number to a remote device; and
receiving the first data from the remote device.

16. The computing system of claim 15, the set of actions further comprising:
determining a user account associated with the first indication; and associating the first identification number with the user account.

17. The computing system of claim 13, the set of actions further comprising:
sending the plurality of images to a display; and
receiving the first indication from a remote control.

18. The computing system of claim 13, the set of actions further comprising:
receiving a second indication to display further information about the first object;
determining second data describing the first object; and
outputting the second data.

19. The computing system of claim 13, the set of actions further comprising, prior to outputting the first data, displaying a visually enhanced representation of the first object.

20. The computing system of claim 13, the set of actions further comprising displaying information regarding purchasing the first object.

* * * * *